US012578449B2

(12) United States Patent
Nam et al.

(10) Patent No.: US 12,578,449 B2
(45) Date of Patent: Mar. 17, 2026

(54) ELECTRONIC DEVICE AND METHOD FOR OBTAINING INFORMATION RELATED TO EXTERNAL OBJECT

(71) Applicant: Samsung Electronics Co., Ltd., Gyeonggi-do (KR)

(72) Inventors: Janghyun Nam, Gyeonggi-do (KR); Hyoseok Na, Gyeonggi-do (KR); Gahyun Lee, Gyeonggi-do (KR); Ukho Lee, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 355 days.

(21) Appl. No.: 17/878,141

(22) Filed: Aug. 1, 2022

(65) Prior Publication Data

US 2023/0100965 A1 Mar. 30, 2023

Related U.S. Application Data

(63) Continuation of application No. PCT/KR2022/011090, filed on Jul. 27, 2022.

(30) Foreign Application Priority Data

Sep. 29, 2021 (KR) ......................... 10-2021-0129311

(51) Int. Cl.
*G01S 13/42* (2006.01)
(52) U.S. Cl.
CPC .................................... *G01S 13/42* (2013.01)
(58) Field of Classification Search
CPC ...................................................... G01S 13/42

(Continued)

(56) References Cited

U.S. PATENT DOCUMENTS 8,552,903 B2 10/2013 Julian et al.
10,171,129 B1 1/2019 Hammerschmidt et al.
(Continued)

FOREIGN PATENT DOCUMENTS

JP 2011-89812 A 5/2011
JP 5985915 B2 8/2016
(Continued)

OTHER PUBLICATIONS

Written Opinion dated Nov. 16, 2022.
International Search Report dated Nov. 16, 2022.

*Primary Examiner* — William Kelleher
*Assistant Examiner* — Samarina Makhdoom
(74) *Attorney, Agent, or Firm* — Sughrue Mion, PLLC

(57) ABSTRACT

An electronic device includes an ultra wide band (UWB) circuit and at least one processor operatively coupled to the UWB circuit. The at least one processor is configured to receive a response signal from at least one external electronic device via the UWB circuit; identify information on distance between the at least one external electronic device and the electronic device; identify an external electronic device located within reference distance from the electronic device in the at least one external electronic device; transmit a second UWB signal via the UWB circuit, toward the identified external electronic device; receive a reflected signal of the second UWB signal caused by an external object including the identified external electronic device within time interval identified based on distance between the electronic device and the identified external electronic device; and based on the reflected signal, obtain information on the external object. Other various embodiments are possible.

20 Claims, 16 Drawing Sheets

(58) Field of Classification Search
   USPC .......................................................... 342/146
   See application file for complete search history.

(56)                    References Cited

U.S. PATENT DOCUMENTS

| | | | |
|---|---|---|---|
| 10,192,378 B2 | 1/2019 | Shin et al. | |
| 10,501,055 B1 * | 12/2019 | Yi | G06Q 50/40 |
| 10,567,034 B2 | 2/2020 | Hammerschmidt et al. | |
| 11,019,195 B2 | 5/2021 | Ledvina et al. | |
| 11,100,734 B2 | 8/2021 | Ahn et al. | |
| 11,171,685 B2 | 11/2021 | Hammerschmidt et al. | |
| 11,375,469 B2 | 6/2022 | Min et al. | |
| 11,509,504 B2 | 11/2022 | Choi et al. | |
| 11,516,337 B2 | 11/2022 | Ledvina et al. | |
| 11,573,313 B2 | 2/2023 | Yoon et al. | |
| 2007/0288995 A1 * | 12/2007 | Terada | H04W 12/068 |
| | | | 726/2 |
| 2015/0029053 A1 * | 1/2015 | Dewberry | G01S 11/02 |
| | | | 342/118 |
| 2018/0081025 A1 * | 3/2018 | Jonsson | B60R 25/245 |
| 2019/0372989 A1 * | 12/2019 | Shultz | H04L 63/0853 |
| 2020/0045537 A1 * | 2/2020 | Colombo | H04W 12/71 |
| 2020/0168017 A1 * | 5/2020 | Prostko | G01S 13/886 |
| 2020/0314651 A1 * | 10/2020 | Pirch | G07C 9/21 |
| 2021/0006652 A1 * | 1/2021 | Ledvina | H04L 69/18 |
| 2021/0092703 A1 * | 3/2021 | Min | H04B 7/088 |
| 2021/0258418 A1 | 8/2021 | Ledvina et al. | |
| 2023/0051718 A1 | 2/2023 | Ledvina et al. | |

FOREIGN PATENT DOCUMENTS

| | | |
|---|---|---|
| KR | 10-1525466 B1 | 6/2015 |
| KR | 10-1582404 B1 | 1/2016 |
| KR | 10-1591164 B1 | 2/2016 |
| KR | 10-1745709 B1 | 6/2017 |
| KR | 10-1752586 B1 | 6/2017 |
| KR | 10-2019-0004240 A | 1/2019 |
| KR | 10-1986155 B1 | 6/2019 |
| KR | 10-2020-0020202 A | 2/2020 |
| KR | 10-2072380 B1 | 2/2020 |
| KR | 10-2020-0036571 A | 4/2020 |
| KR | 10-2020-0130920 A | 11/2020 |
| KR | 10-2021-0034270 A | 3/2021 |
| KR | 10-2021-0043642 A | 4/2021 |
| KR | 10-2264941 B1 | 6/2021 |

* cited by examiner

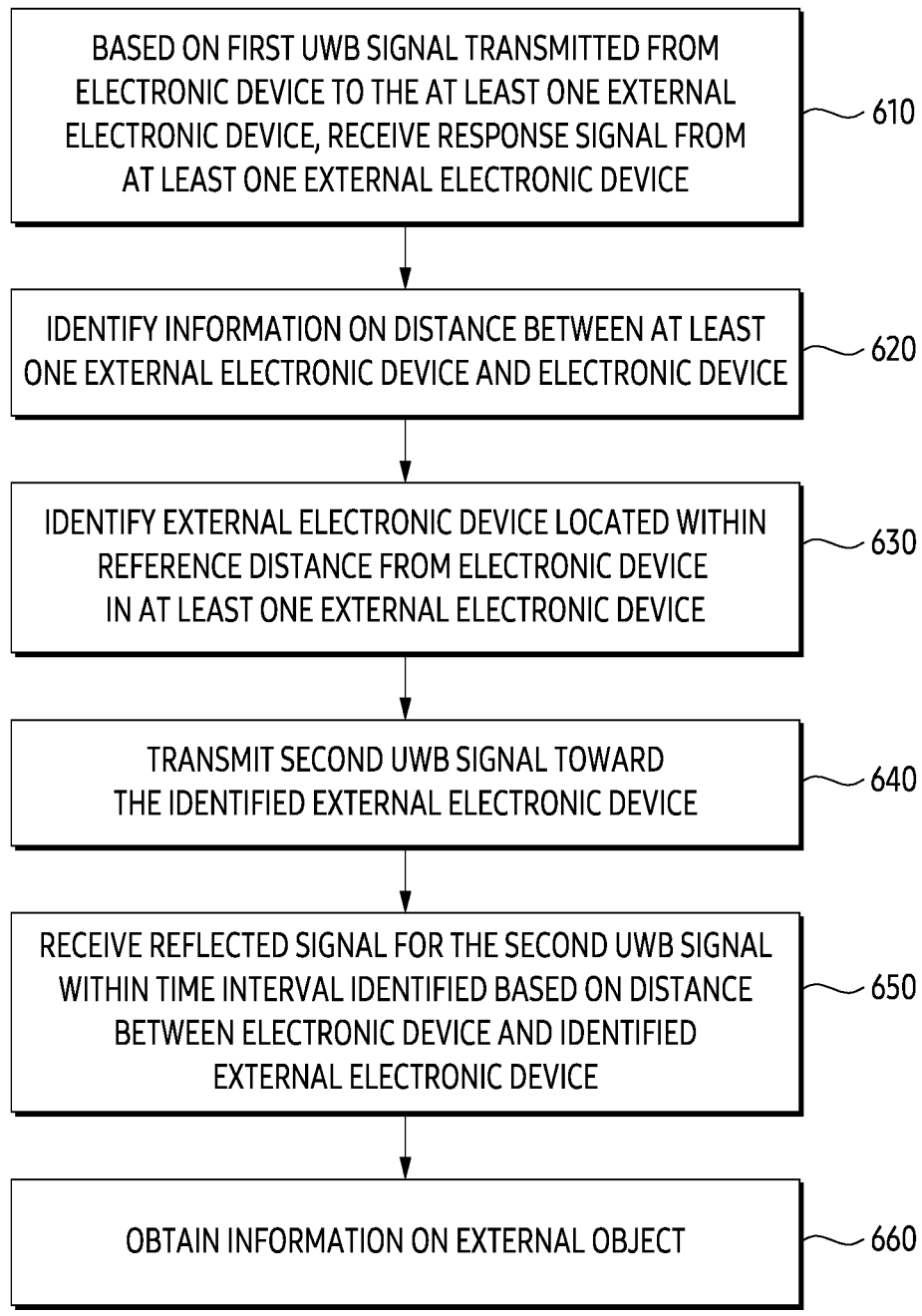

BASED ON FIRST UWB SIGNAL TRANSMITTED FROM ELECTRONIC DEVICE TO THE AT LEAST ONE EXTERNAL ELECTRONIC DEVICE, RECEIVE RESPONSE SIGNAL FROM AT LEAST ONE EXTERNAL ELECTRONIC DEVICE —— 610

IDENTIFY INFORMATION ON DISTANCE BETWEEN AT LEAST ONE EXTERNAL ELECTRONIC DEVICE AND ELECTRONIC DEVICE —— 620

IDENTIFY EXTERNAL ELECTRONIC DEVICE LOCATED WITHIN REFERENCE DISTANCE FROM ELECTRONIC DEVICE IN AT LEAST ONE EXTERNAL ELECTRONIC DEVICE —— 630

TRANSMIT SECOND UWB SIGNAL TOWARD THE IDENTIFIED EXTERNAL ELECTRONIC DEVICE —— 640

RECEIVE REFLECTED SIGNAL FOR THE SECOND UWB SIGNAL WITHIN TIME INTERVAL IDENTIFIED BASED ON DISTANCE BETWEEN ELECTRONIC DEVICE AND IDENTIFIED EXTERNAL ELECTRONIC DEVICE —— 650

OBTAIN INFORMATION ON EXTERNAL OBJECT —— 660

FIG. 6

IDENTIFY AT LEAST ONE EXTERNAL ELECTRONIC DEVICE
LOCATED WITHIN DESIGNATED DISTANCE FROM ELECTRONIC DEVICE ~ 910

CHANGE OPERATION STATE OF UWB CIRCUIT FROM
DEACTIVATED STATE TO ACTIVATED STATE ~ 920

FIG. 10

AFTER DESIGNATED TIME INTERVAL FROM TIMING AT WHICH THE SECOND UWB SIGNAL IS TRANSMITTED, TRANSMIT THIRD UWB SIGNAL TO IDENTIFIED EXTERNAL ELECTRONIC DEVICE ~1110

RECEIVE REFLECTED SIGNAL FOR THIRD UWB SIGNAL WITHIN ANOTHER TIME INTERVAL IDENTIFIED BASED ON THE INFORMATION ON EXTERNAL OBJECT ~1120

OBTAIN ANOTHER INFORMATION ON EXTERNAL OBJECT ~1130

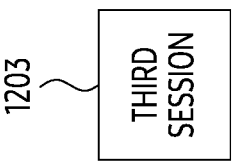
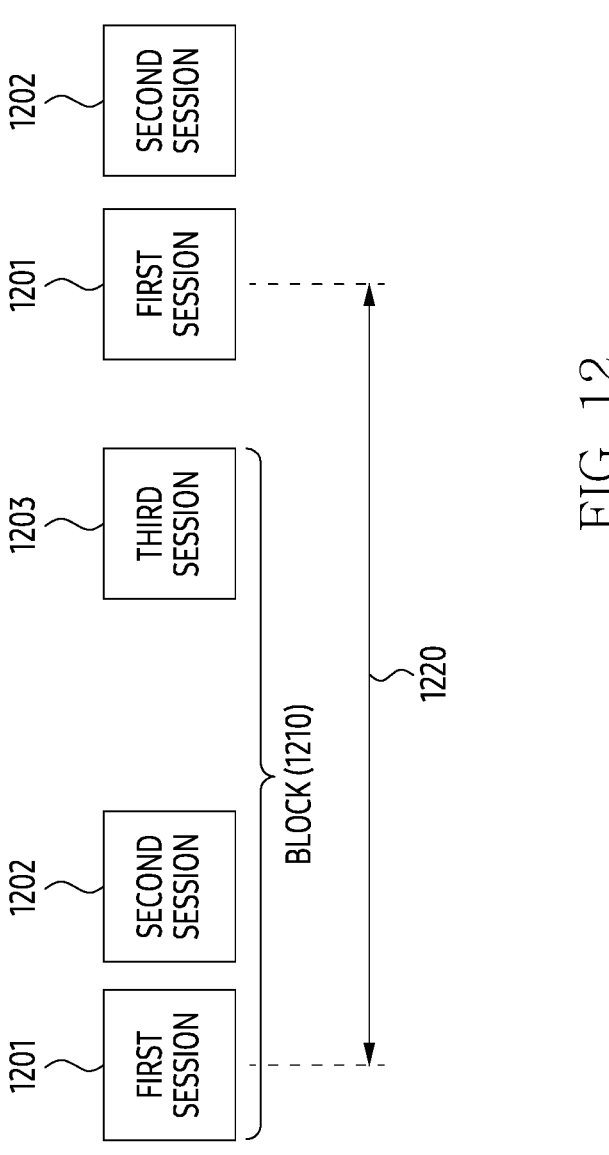
FIG. 12

ELECTRONIC DEVICE AND METHOD FOR OBTAINING INFORMATION RELATED TO EXTERNAL OBJECT

CROSS-REFERENCE TO RELATED APPLICATION(S)

This application is a continuation of International Application No. PCT/KR2022/011090, which was filed on Jul. 27, 2022, and claims priority to Korean Patent Application No. 10-2021-0129311, filed on Sep. 29, 2021, in the Korean Intellectual Property Office, the disclosure of which are incorporated by reference herein their entirety.

BACKGROUND

Technical Field

One or more embodiments of the present disclosure generally relate to an electronic device and a method for obtaining information on an external object.

Description of Related Art

Ultra wide band (UWB) communication technology may be used to measure the distance and angle between an electronic device and an external electronic device. The UWB communication technology can more accurately measure distance and angle compared to measurements done using radio access technology (RAS). The electronic device may measure the distance and the angle between the electronic device and the external electronic device based on an UWB signal.

SUMMARY

An electronic device may identify the distance between the electronic device and multiple external electronic devices. When the electronic device identifies the distances between it and every other external electronic device, power consumption of the electronic device may increase.

The technical problems to be achieved in this document are not limited to those described above, and other technical problems not mentioned herein will be clearly understood by those having ordinary knowledge in the art to which the present disclosure belongs, from the following description.

An electronic device according to an embodiment may comprise an ultra wide band (UWB) circuit and at least one processor operatively coupled to the UWB circuit, wherein the at least one processor may be configured to receive a response signal from at least one external electronic device via the UWB circuit, based on a first UWB signal transmitted from the electronic device to the at least one external electronic device, identify, based on the response signal, identify information on a distance between the at least one external electronic device and the electronic device, identify an external electronic device in the at least one external electronic device located within a reference distance from the electronic device, based on the information on the distance between the at least one external electronic device and the electronic device, transmit a second UWB signal via the UWB circuit, toward the identified external electronic device, receive a reflected signal of the second UWB signal caused by an external object including the identified external electronic device within a time interval identified based on distance between the electronic device and the identified external electronic device, and based on the reflected signal, obtain information on the external object.

A method of the electronic device according to an embodiment may comprise receiving, based on a first UWB signal transmitted from an electronic device to the at least one external electronic device, a response signal from the at least one external electronic device via an UWB circuit included in the electronic device, identifying, based on the response signal, information on a distance between the at least one external electronic device and the electronic device, identifying, based on the information on the distance between the at least one external electronic device and the electronic device, an external electronic device in the at least one external electronic device located within a reference distance from the electronic device, transmitting a second UWB signal to the identified external electronic device via the UWB circuit toward the identified external electronic device, receiving the reflected signal of the second UWB signal, within a time interval identified based on a distance between the electronic device and the identified external electronic device, caused by an external object including the identified external electronic device; and based on the reflected signal, obtaining information on the external object.

According to an embodiment, one or more programs stored in a non-transitory computer readable storage medium may comprise instructions, which, when being executed by at least one processor of an electronic device, cause the electronic device to receive, based on a first UWB signal transmitted from the electronic device to at least one external electronic device, a response signal from the at least one external electronic device via an UWB circuit, identify based on the response signal, information on a distance between the at least one external electronic device and the electronic device, identify an external electronic device in the at least one external electronic device located within reference distance from the electronic device, based on the information on the distance between the at least one external electronic device and the electronic device, transmit a second UWB signal via the UWB circuit, toward the identified external electronic device, receive a reflected signal of the second UWB signal, caused by an external object including the identified external electronic device, within a time interval identified based on a distance between the electronic device and the identified external electronic device, and based on the reflected signal, obtain information on the external object.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a flowchart illustrating an operation of an electronic device according to an embodiment.

FIG. 10 illustrates an example of an operation of an electronic device based on a distance between an electronic device and an external electronic device according to an embodiment.

FIG. 12 illustrates an example of an operation of an electronic device operating at a designated time interval according to an embodiment.

DETAILED DESCRIPTION

According to an embodiment of the present disclosure, the electronic device may set a reference distance for identifying the distance between the electronic device and an external electronic device.

An electronic device according to an embodiment may identify information on distance between at least one external electronic device and the electronic device. The electronic device may identify an external electronic device located within a reference distance from the electronic device. The electronic device may identify information on an external object including the external electronic device based on a reflected signal of the UWB signal transmitted to the identified external electronic device.

Figure 1:
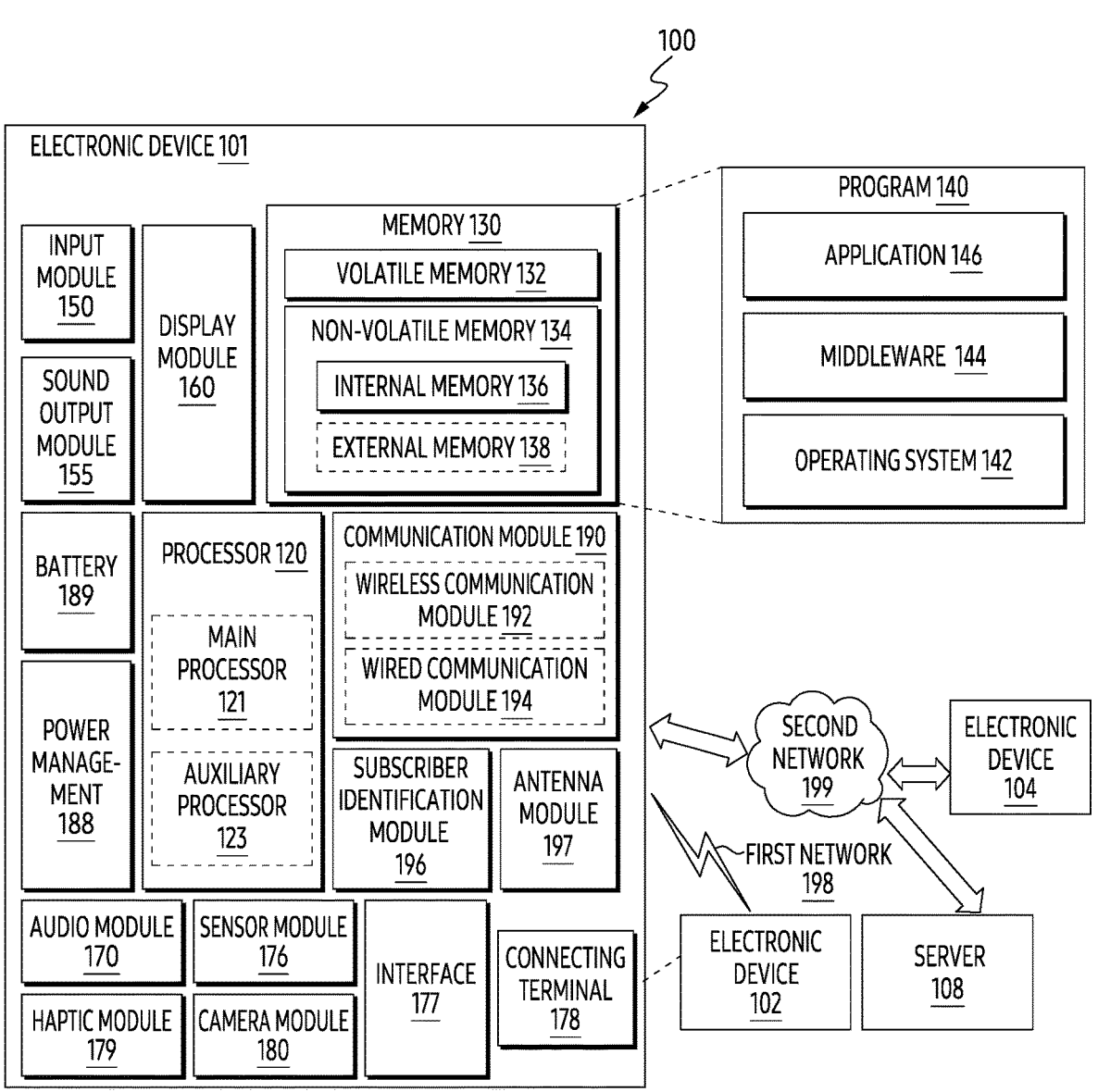
FIG. 1 is a block diagram of an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, for example, by the electronic device 101 where the artificial intelligence is performed or via a separate server (e.g., the server 108). Learning algorithms may include, for example supervised learning, unsupervised learning, semi-supervised learning, or reinforcement learning but is not limited to the above-described example. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound through the sound output module 155 or an external electronic device (e.g., the electronic device 102) (e.g., a speaker or headphone) directly or wirelessly connected to the electronic device 101

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via own tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, for example, new radio (NR) access technology. The NR access technology may support enhanced mobile broadband (eMBB), massive machine type communications (mMTC), or ultra-reliable and low-latency communications (URLLC). For example the wireless communication module 192 may support a high-frequency band (e.g., the mmWave band) to achieve a high data transmission rate. The wireless communication module 192 may support various technologies for securing performance on a high-frequency band, for example such as beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include an antenna including a conductor formed on a substrate (e.g., a PCB) or a radiator formed of a conductive pattern. According to an embodiment, the antenna module 197 may include a plurality of antennas (e.g., array antennas). In this case, at least one antenna appropriate for a communication scheme used in the communication network such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiments, the antenna module 197 may form a mmWave antenna module. According to an embodiment, the mmWave antenna module may include a printed circuit board, a RFIC disposed on or adjacent to a first surface (e.g., a bottom surface) of the printed circuit board and capable of supporting a designated high frequency band (e.g., a mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be connected mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, the command or data may be transmitted or received between the electronic device 101 and the external electronic device 104 via the server 108 connected with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 needs to perform a function or service automatically or in response to a request from a user or other device, the electronic device 101, instead of, or in addition to, executing the function or the service by itself, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may process the result as it is or additionally and provide the result as at least a part of a response to the request. To that end, a cloud computing, distributed computing, mobile edge computing (MEC), or client-server computing technology may be used, for example. The electronic device 101, for example, may provide ultra low-latency services using distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

According to an embodiment, a processor (e.g., a processor 120 of FIG. 1) of an electronic device (e.g., an electronic device 101 of FIG. 1) may identify distance between the electronic device and an external electronic device around the electronic device via an UWB signal. The processor may control the external electronic device based on the distance between the electronic device and the external electronic device.

An operation of the electronic device (or the processor of the electronic device) for the above-described embodiment may be described below. The electronic device described below may correspond to the electronic device 101 of FIG. 1. An external electronic device (or at least one external electronic device) to be described below may correspond to the electronic device 102 of FIG. 1.

Figure 2:
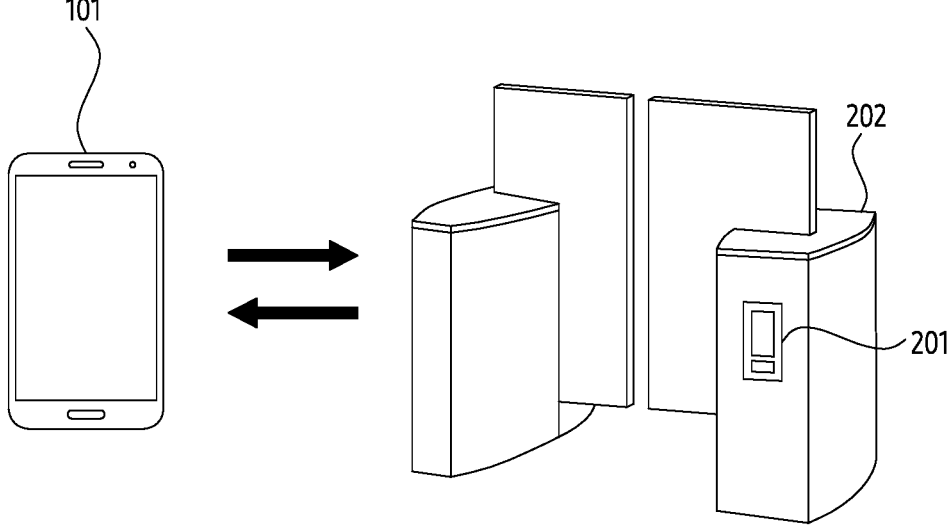
FIG. 2 illustrates an environment in which an electronic device communicates with an external electronic device according to an embodiment.

FIG. 2 illustrates an environment in which an electronic device communicates with an external electronic device according to an embodiment.

Referring to FIG. 2, the electronic device 101 may establish a connection with the external electronic device 201.

For example, the electronic device 101 may establish a UWB connection with the external electronic device 201. The electronic device 101 may transmit an UWB signal to the external electronic device 201 via the UWB connection with the external electronic device 201. The electronic device 101 may receive the UWB signal via the UWB connection from the external electronic device 201. In one embodiment, the electronic device 101 may identify the distance between the electronic device 101 and the external electronic device 201 based on the UWB signal.

In another example, the electronic device 101 may establish a connection based on radio access technology (RAT) that is distinct from UWB communication (e.g., a connection for Bluetooth low energy (BLE)) with the external electronic device 201. The electronic device 101 may transmit another signal (e.g., a BLE signal) distinct from an UWB signal to the external electronic device 201 via the RAT connection with the external electronic device 201. The electronic device 101 may receive another signal distinct from the UWB signal from the external electronic device 201 via the RAT connection with the external electronic device 201. In this embodiment, the electronic device 101 may identify the distance between the electronic device 101 and the external electronic device 201 based on the signal that is distinct from the UWB signal.

According to an embodiment, the electronic device 101 may identify the distance between the electronic device 101 and the external electronic device 201 even when the RAT connection is not established. For example, the electronic device 101 may identify another signal that is distinct from the UWB signal emitted (or transmitted) from the external electronic device 201 even when the RAT connection is not established. The electronic device 101 may identify that the external electronic device 201 is located around the electronic device 101, based on identifying the other signal that is distinct from the UWB signal. The electronic device 101 may identify the distance between the electronic device 101 and the external electronic device 201 based on identifying this other signal distinct from the UWB signal.

According to an embodiment, the external electronic device 201 may be included in an external object 202. For example, the external object 202 may be referred to as housing for the external electronic device 201. For example, the external object 202 may include at least one circuit (e.g., blocking circuit) operating based on a control signal received from the external electronic device 201.

According to an embodiment, the electronic device 101 may identify information on the external object 202 based on the UWB signal. For example, the information on the external object 202 may include information on a shape of the external object 202 and information on the distance between the electronic device 101 and the external object 202

Figure 3:
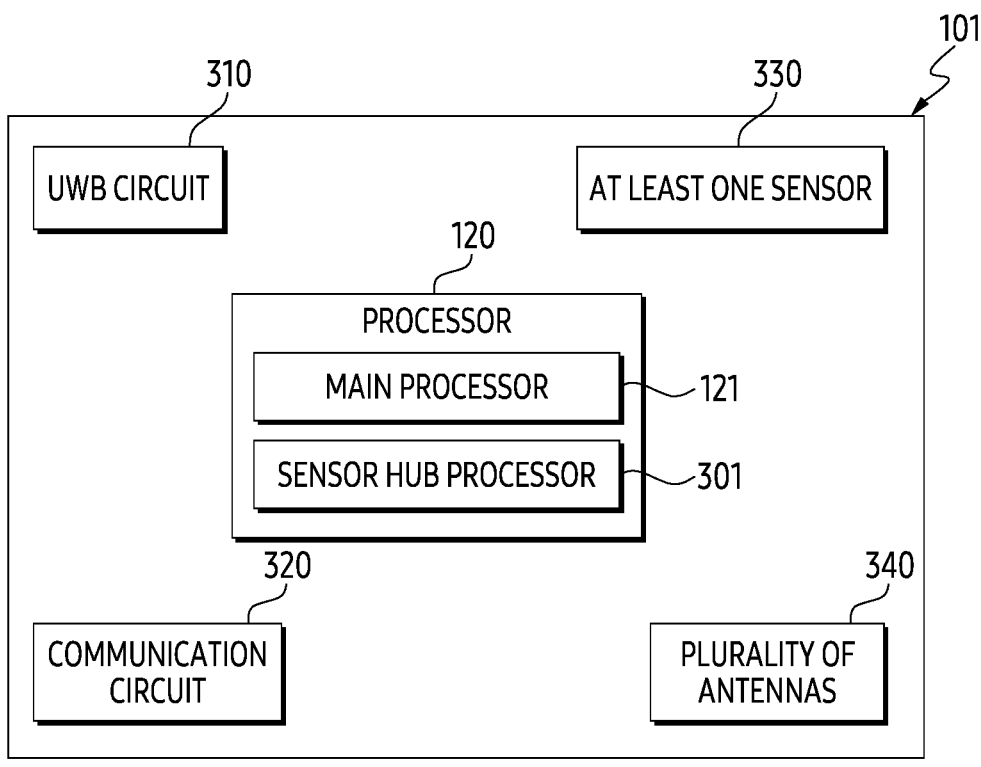
FIG. 3 is a simplified block diagram of an electronic device according to an embodiment.

FIG. 3 is a simplified block diagram of an electronic device according to an embodiment.

Referring to FIG. 3, the electronic device 101 of FIG. 3 may correspond to the electronic device 101 of FIG. 2. The electronic device 101 may include the processor 120, an UWB circuit 310, a communication circuit 320, at least one sensor 330, and/or a plurality of antennas 340. According to an embodiment, the electronic device 101 may include at least one of the processor 120, the UWB circuit 310, the communication circuit 320, the at least one sensor 330, and the plurality of antennas 340. For example, the electronic device 101 may omit at least some of the processor 120, the UWB circuit 310, the communication circuit 320, the at least one sensor 330, and the plurality of antennas 340, according to embodiments, or include other components not shown.

According to an embodiment, the UWB circuit 310, the communication circuit 320, and the at least one sensor 330 may be controlled by the processor 120. The processor 120 may include, for example, the main processor 121 and a sensor hub processor 301. For example, the sensor hub processor 301 may process data obtained by the at least one sensor 330. The sensor hub processor 301 may process work offloaded from the main processor 121 to reduce power consumption and improve performance of the electronic device 101.

Although not shown, according to an embodiment, the main processor 121, the sensor hub processor 301, the UWB circuit 310, and the communication circuit 320 may be connected via various connection schemes. For example, the main processor 121 may be connected to the communication circuit 320 via personal component interconnect standard express (PCIe) and/or universal async receiver/transmitter (UART). In another example, the main processor 121 may be connected to the sensor hub processor 301 via a serial peripheral interface (SPI). In yet another example, the UWB circuit 310 may be connected to the sensor hub processor 301 via an inter-integrated circuit (I2C). In still yet another example, the UWB circuit 310 may be connected to the communication circuit 320 via one of a wireless local area network (WLAN) and UART. As a final example, the communication circuit 320 may be connected to the sensor hub processor 301 via I2C.

According to an embodiment, the UWB circuit 310 and the communication circuit 320 may correspond to at least a portion of the communication module 190 of FIG. 1.

The UWB circuit 310 may be used to transmit and/or receive UWB signals. The UWB signals may be transmitted and/or received via at least one of a plurality of channels. The plurality of channels may be variously set within a designated band. For example, the designated band and/or the plurality of channels may be set differently for different countries. In one example, the designated band may be set to be 6.25 GHz to 8.25 GHz.

For example, the designated band may be divided into three groups based on frequency. Each group may include at least one channel. For example, the first group may be referred to as a sub-GHz band. The second group may be referred to as low band. The third group may be referred to as high band. In this example, the first group may include a first channel (or channel 0). The second group may include second to fifth channels (or channels 1 to 4). The third group may include sixth to sixteenth channels (or channels 5 to 15).

The UWB signal may be implemented as a pulse waveform. For example, the period of the pulse forming the UWB signal may be set to about 2 ns. For example, the bandwidth of the UWB signal may be set to about 500 MHz. However, the UWB signal is not so limited. The UWB signal may be implemented as various waveforms (e.g., sine waveforms), and the period and/or bandwidth of the UWB signal may vary.

According to an embodiment, the communication circuit 320 may be used for the radio access technology (RAT) that is distinct from UWB (or UWB communication). The communication circuit 320 may be used to perform at least one communication distinct from UWB (or UWB communication). For example, the communication circuit 320 may be used to perform Bluetooth low energy (BLE) communication or wireless local area network (WLAN) communication.

According to an embodiment, the at least one sensor 330 may correspond to the sensor module 176 of FIG. 1. For example, the at least one sensor 330 may include a sensor for identifying movement of an electronic device. For example, the processor 120 may identify information on a moving direction of the electronic device 101 using the at least one sensor 330. For an example, the sensor hub processor 301 may identify information on the moving direction of the electronic device 101 based on the data received from the at least one sensor 330. The sensor hub processor 301 may transmit information on the moving direction of the electronic device 101 to the main processor 121. The sensor hub processor 301 may transmit information on the moving direction of the electronic device 101 to the UWB circuit 310.

For example, at least one sensor may include an acceleration sensor or a gyro sensor. The acceleration sensor may identify (or measure, detect) acceleration of the electronic device 101 in three directions of the x-axis, the y-axis, and the z-axis. The gyro sensor may identify (or measure, detect) angular speeds of the electronic device 101 in three directions: the x-axis, the y-axis, and the z-axis.

According to an embodiment, a plurality of antennas 340 may be electrically connected to the UWB circuit 310 and/or the communication circuit 320. For example, the UWB circuit 310 may transmit UWB signals to the external electronic device 201 using at least one of the plurality of antennas 340. In another example, the communication circuit 320 may transmit BLE signals to the external electronic device 201 using the at least one of the plurality of antennas 340.

For example, the plurality of antennas 340 may include a first antenna and/or a second antenna which are omni-directional antennas. The plurality of antennas 340 may include at least one antenna that is a directional antenna. A specific example of the plurality of antennas 340 will be described later with reference to FIG. 4.

Figure 4:
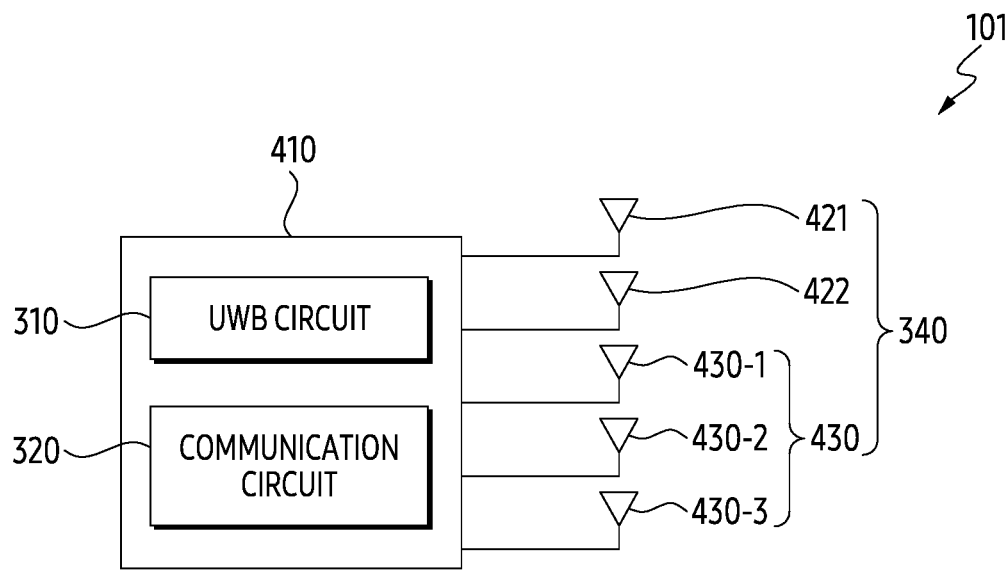
FIG. 4 illustrates examples of a configuration of a plurality of antennas of an electronic device according to an embodiment.

FIG. 4 illustrates examples of a configuration of a plurality of antennas of an electronic device according to an embodiment.

Referring to FIG. 4, the electronic device 101 of FIG. 4 may correspond to the electronic device 101 of FIGS. 2 and 3. The electronic device 101 may include a circuit 410 including the UWB circuit 310 and the communication circuit 320 and the plurality of antennas 340. For example, the plurality of antennas 340 may include a first antenna 421, a second antenna 422, and at least one antenna 430. For example, the at least one antenna 430 may include a third antenna 430-1, a fourth antenna 430-2, or a fifth antenna 430-3.

For example, the first antenna 421, the second antenna 422, and the at least one antenna 430 may be connected to the UWB circuit 310. The first antenna 421, the second antenna 422, and/or the at least one antenna 430 may be used to transmit UWB signals. The first antenna 421, the second antenna 422, and/or the at least one antenna 430 may be used to receive UWB signals.

In another example, the first antenna 421, the second antenna 422, and the at least one antenna 430 may be connected to the communication circuit 320. The first antenna 421, the second antenna 422, and/or the at least one antenna 430 may be used to transmit signals (e.g., BLE signal) distinct from the UWB signals.

The first antenna 421, the second antenna 422, and/or the at least one antenna 430 may be used to receive signals (e.g., BLE signal) distinct from the UWB signals.

The first antenna 421 and the second antenna 422 may be omnidirectional antennas. For example, the first antenna 421 and the second antenna 422 may be made of metal and made using laser direct structuring (LDS).

According to an embodiment, the processor 120 (or the UWB circuit 310 controlled by the processor 120) may identify the distance between the electronic device 101 and the external electronic device (e.g., the external electronic device 201 of FIG. 2), using at least one of the first antenna 421 and the second antenna 422, based on an UWB signal and the response signal to the UWB signal.

According to an embodiment, the processor 120 (or the UWB circuit 310 controlled by the processor 120) may identify the distance between the electronic device 101 and the external object (e.g., the external object 202 of FIG. 2), using both the first antenna 421 and the second antenna 422, based on an UWB signal and a reflected signal of the UWB signal.

For example, the first antenna 421 may be used for transmitting a signal (e.g., UWB signal). The second antenna 422 may be used for receiving a signal (e.g., UWB signal). The transmission of the signal via the first antenna 421 and the reception of the signal via the second antenna 422 may be performed independently. For example, the processor 120 may receive a signal via the second antenna 422 while transmitting a signal via the first antenna 421. Conversely, the processor 120 may transmit a signal via the first antenna 421 while receiving the signal via the second antenna 422.

According to an embodiment, functions of the first antenna 421 and the second antenna 422 may be changed depending on time or situation. For example, unlike the above-described example, the first antenna 421 may be used for receiving a signal. The second antenna 422 may be used for transmitting a signal. As another example, the first antenna 421 and the second antenna 422 may be used for simultaneously receiving signals in a first time interval. In that case the first antenna 421 and the second antenna 422 may be used for simultaneously transmitting signals in a second time interval.

According to an embodiment, the at least one antenna 430 may be a directional antenna. For example, the at least one antenna 430 may include a patch antenna. The at least one antenna 430 may be used to identify information on the direction in which the external electronic device (e.g., the external electronic device 201 of FIG. 2) is located with respect to the electronic device 101.

According to an embodiment, the at least one antenna 430 may include three antennas. For example, the at least one antenna 430 may include a third antenna 430-1, a fourth antenna 430-2, and a fifth antenna 430-3. According to an embodiment, the processor 120 may perform a calibration process for improving accuracy of data obtained via the at least one antenna 430.

According to an embodiment, the third antenna 430-1, the fourth antenna 430-2, and the fifth antenna 430-3 may be disposed in the electronic device 101, in an L-shape, to support a vertical mode (or portrait mode) or a horizontal mode (or landscape mode). For an example, when the electronic device 101 operates in the vertical mode, the processor 120 may identify information on the direction in which the external electronic device is located with respect to the electronic device 101, via the third antenna 430-1 and the fourth antenna 430-2. In another example, when the electronic device 101 operates in the horizontal mode, the processor 120 may identify information on direction in which the external electronic device is located with respect to the electronic device 101 via the fourth antenna 430-2 and the fifth antenna 430-3.

According to an embodiment, the processor 120 may identify information on the location of the external electronic device using the first antenna 421 and the at least one antenna 430. For example, the processor 120 may transmit an UWB signal to the external electronic device via the first antenna 421. The processor 120 may receive a response signal to the UWB signal from an external electronic device. The processor 120 may identify the distance between the electronic device 101 and the external electronic device based on timing at which the UWB signal is transmitted and timing at which the UWB signal is received. The processor 120 may receive the response signal via at least some of the at least one antenna 430. The processor 120 may identify the direction in which the external electronic device is located with respect to the electronic device 101, based on the phase difference of the response signal received via the at least some of the at least one antenna 430.

Figure 5:
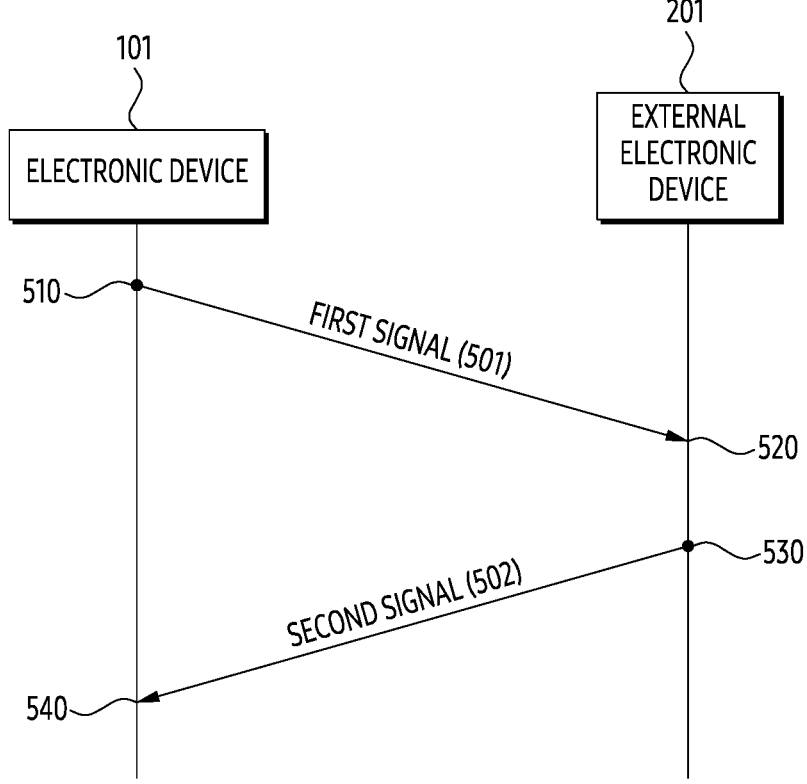
FIG. 5 illustrates an example of an operation of an electronic device for identifying a distance between an electronic device and an external electronic device according to an embodiment.

FIG. 5 illustrates an example of an operation of an electronic device for identifying a distance between an electronic device and an external electronic device according to an embodiment.

Referring to FIG. 5, the electronic device 101 may correspond to the electronic device 101 of FIGS. 2 and 3.

The external electronic device 201 may correspond to the external electronic device 201 of FIG. 2.

According to an embodiment, the processor 120 of the electronic device 101 may transmit a first signal 501 to the external electronic device 201 to identify the distance between the electronic device 101 and the external electronic device 201. The external electronic device 201 may receive the first signal 501 from the electronic device 101. For example, the processor 120 may transmit the first signal 501 to the external electronic device 201 at first timing 510. The external electronic device 201 may receive the first signal 501 at second timing 520.

The external electronic device 201 may transmit a second signal 502 to the electronic device 101 as a response signal to the first signal 501. The processor 120 of the electronic device 101 may receive the second signal 502 from the external electronic device 201. For example, the external electronic device 201 may transmit the second signal 502 at third timing 530. The processor 120 of the electronic device 101 may receive the second signal 502 at fourth timing 540. For example, the second signal 502 may be referred to as the response signal to the first signal 501.

According to an embodiment, the processor 120 may identify information on the time interval between the second timing 520 and the third timing 530 based on the second signal 502. For example, the second signal 502 may include the information on the time interval between the second timing 520 and the third timing 530.

The processor 120 may identify the time period required for transmission of the first signal 501 and the second signal 502. For example, the processor 120 may identify the sum of the first time interval between the first timing 510 and the second timing 520, and the second time interval between the third timing 530 and the fourth timing 540, which are time periods required to transmit the first signal 501. In one example, the processor 120 may identify the sum of the first time interval and the second time interval while excluding the time interval between the second timing 520 and the third timing 530 from the time interval between the first timing 510 and the fourth timing 540.

The processor 120 may identify the distance between the electronic device 101 and the external electronic device 201 based on the sum of the first time interval and the second time interval. In one specific example, the processor 120 may identify the distance between the electronic device 101 and the external electronic device 201, by multiplying the half of the sum of the first time interval and the second time interval by the propagation speed (e.g. speed of light) of the first signal and the second signal.

According to an embodiment, the electronic device 101 and the external electronic device 201 may be synchronized. The second signal 502 may include information on the timing 520 in which the first signal 501 is received by the external electronic device 201. The processor 120 may identify a first time interval between the first timing 510 and the second timing 520. The processor 120 may identify the distance between the electronic device 101 and the external electronic device 201 by multiplying the first time interval by a propagation speed of the first signal.

FIG. 6 is a flowchart illustrating an operation of an electronic device according to an embodiment. This method may be executed by the electronic device 101 illustrated in FIGS. 2 and 3 and the processor 120 of the electronic device 101.

Referring to FIG. 6, in operation 610, the processor 120 may receive a response signal from at least one external electronic device, based on a first UWB signal transmitted from the electronic device to the at least one external electronic device. For example, the processor 120 may receive a response signal from the at least one external electronic device via the UWB circuit 310.

According to an embodiment, the processor 120 may transmit the first UWB signal to the at least one external electronic device. The processor 120 may transmit the first UWB signal to identify information on the distance between the at least one external electronic device and the electronic device 101. For example, the first UWB signal may include information for receiving a response signal for the first UWB signal from the at least one external electronic device.

For example, the first UWB signal may include multiple signals transmitted to the at least one external electronic devices, and the signals may be different from each other. In an example, the first UWB signal transmitted to a first external electronic device and the first UWB signal transmitted to a second external electronic device may be set different.

For example, the first UWB signal transmitted to the at least one external electronic device may be transmitted at different timings. In one example, the timing at which a first UWB signal is transmitted to the first external electronic device may be set differently from the timing at which a first UWB signal is transmitted to the second external electronic device.

The processor 120 may receive a response signal from the at least one external electronic device based on the first UWB signal. For example, one of the at least one external electronic device may transmit a response signal to the first UWB signal to the electronic device 101.

In operation 620, the processor 120 may identify information on the distance between the at least one external electronic device and the electronic device 101. The processor 120 may identify the information on the distance between the at least one external electronic device and the electronic device 101, based on the response signal.

For example, the processor 120 may identify the information on the distance between the at least one external electronic device and the electronic device 101, based on the operation of the electronic device 101 shown in FIG. 5.

For example, the response signal may include information on a delay for transmitting the response signal. The processor 120 may identify timing at which the first UWB signal is transmitted. The processor 120 may identify information on the location of the at least one external electronic device, based on information on the timing at which the first UWB signal is transmitted, timing at which the response signal is received, and the delay for transmission of the response signal.

According to an embodiment, the processor 120 may identify information on distance between the at least one external electronic device and the electronic device 101 as well as information on the direction of the at least one external electronic device 101 with respect to the electronic device 101. For example, the processor 120 may identify information on the direction of the at least one external electronic device, based on the phase difference of the response signal received via at least some of the antennas of the electronic device 101.

In operation 630, the processor 120 may identify an external electronic device (e.g., the external electronic device 201 of FIG. 2) located within a reference distance from the electronic device 101. The processor 120 may identify the external electronic device located within the reference distance based on information on the distance from the external electronic device 101. For example, the identified external electronic device may include an external electronic device closest to the electronic device 101 in the at least one external electronic device. As another example, the identified external electronic device may be an external electronic device closest to the electronic device 101 in the at least one external electronic device.

For example, the reference distance may refer to a distance appropriate for transmitting a second UWB signal. The processor 120 may set the distance for transmitting the second UWB signal as the reference distance and activate an operation (or session) for identifying a reflected signal of the second UWB signal. For example, the processor 120 may transmit the second UWB signal and activate an operation (or session) for identifying the reflected signal of the second UWB signal, based on identifying an external electronic device located within the reference distance.

For example, the processor 120 may identify that one of the at least one external electronic device is located within the reference distance, based on the movement of the electronic device 101 and/or the movement of the external electronic device.

In operation 640, the processor 120 may transmit a second UWB signal toward the identified external electronic device. For example, the second UWB signal may be transmitted to identify distance between the external object including the external electronic device and the electronic device 101. For example, the second UWB signal may not include data to be transmitted to an external electronic device. In one example, the second UWB signal may be implemented as a single pulse waveform.

In operation 650, the processor 120 may receive the reflected signal of the second UWB signal within a time interval identified based on the distance between the electronic device 101 and the identified external electronic device. The processor 120 may receive the reflected signal of the second UWB signal that is reflected by the external object including the identified external electronic device, within the identified time interval based on the distance between the electronic device 101 and the identified external electronic device.

The reflected signal of the second UWB signal may be caused by the external object (e.g., the external object 202 of FIG. 2) including the identified external electronic device. For example, the second UWB signal may be reflected by the external object including the identified external electronic device. The processor 120 may receive the reflected signal for the second UWB signal reflected by the external object. For an example, at least a portion of the second UWB signal is reflected by the external object, and the reflected signal may be received by the processor 120. The remaining portion of the second UWB signal may penetrate into the external object.

The processor 120 may identify a time interval based on distance between the electronic device 101 and the identified external electronic device. To identify the time interval, the processor 120 may set an identified distance, based on the distance between the electronic device 101 and the identified external electronic device. The processor 120 may identify the time interval, based on the identified distance.

For example, the processor 120 may identify locations spaced apart by the identified distance from the identified location of the external electronic device. The processor 120 may set a location closer to the electronic device 101 by the identified distance from the identified location of the external electronic device as a first location. The processor 120 may set a location farther to the electronic device 101 by the identified distance from the identified location of the external electronic device as a second location. The identified external electronic device may be located between the first location and the second location with respect to the electronic device 101.

The processor 120 may identify a first timing at which the second UWB signal is reflected and received from the first location and a second timing at which the second UWB signal is reflected and received from the second location. The processor 120 may identify a time interval between the first timing and the second timing as a time interval for receiving the second UWB signal.

In operation 660, the processor 120 may obtain information on the external object. The processor 120 may obtain information on the external object based on the reflected signal. For example, the information on the external object may include information on the shape of the external object and information on the distance between the electronic device 101 and the external object.

The processor 120 may obtain information on the external object based on the time interval from timing at which the second UWB signal is transmitted, to timing at which the reflected signal for the second UWB signal is received. For example, the processor 120 may obtain information on distance between the electronic device 101 and the external object, by multiplying half of the time interval from the timing at which the second UWB signal is transmitted, to the timing at which the reflected signal for the second UWB signal is received, by the propagation speed (e.g., light speed) for the second UWB signal.

According to an embodiment, the processor 120 may obtain information on the shape of the external object based on the reflected signal. The processor 120 may identify the external object based on the information on the shape of the external object. For example, the processor 120 may identify the external object as a vehicle, based on the shape of the external object being the shape of a car. As another example, the processor 120 may identify the external object as a gate, based on that the shape of the external object is in the form of a gate.

According to an embodiment, the information on the distance between the electronic device 101 and the external object may correspond to the information on the distance between the electronic device 101 and the external electronic device. An error range of the information on distance between the electronic device 101 and the external object may be set to be smaller than an error range of the information on the distance between the electronic device 101 and the external electronic device. For example, the information on the distance between the electronic device 101 and the external object obtained based on the reflected signal for the second UWB signal may be more accurate than the information on the distance between the electronic device 101 and the external electronic device obtained based on the response signal for the first UWB signal. In another example, reliability of the information on the distance between the electronic device 101 and the external object obtained based on the reflected signal for the second UWB signal may be set higher than reliability of the information on the distance between the electronic device 101 and the external electronic device obtained based on the response signal to the first UWB signal.

According to an embodiment, the processor 120 may transmit a request signal for controlling the external object to the external electronic device, based on the information on the external object.

Figure 7:
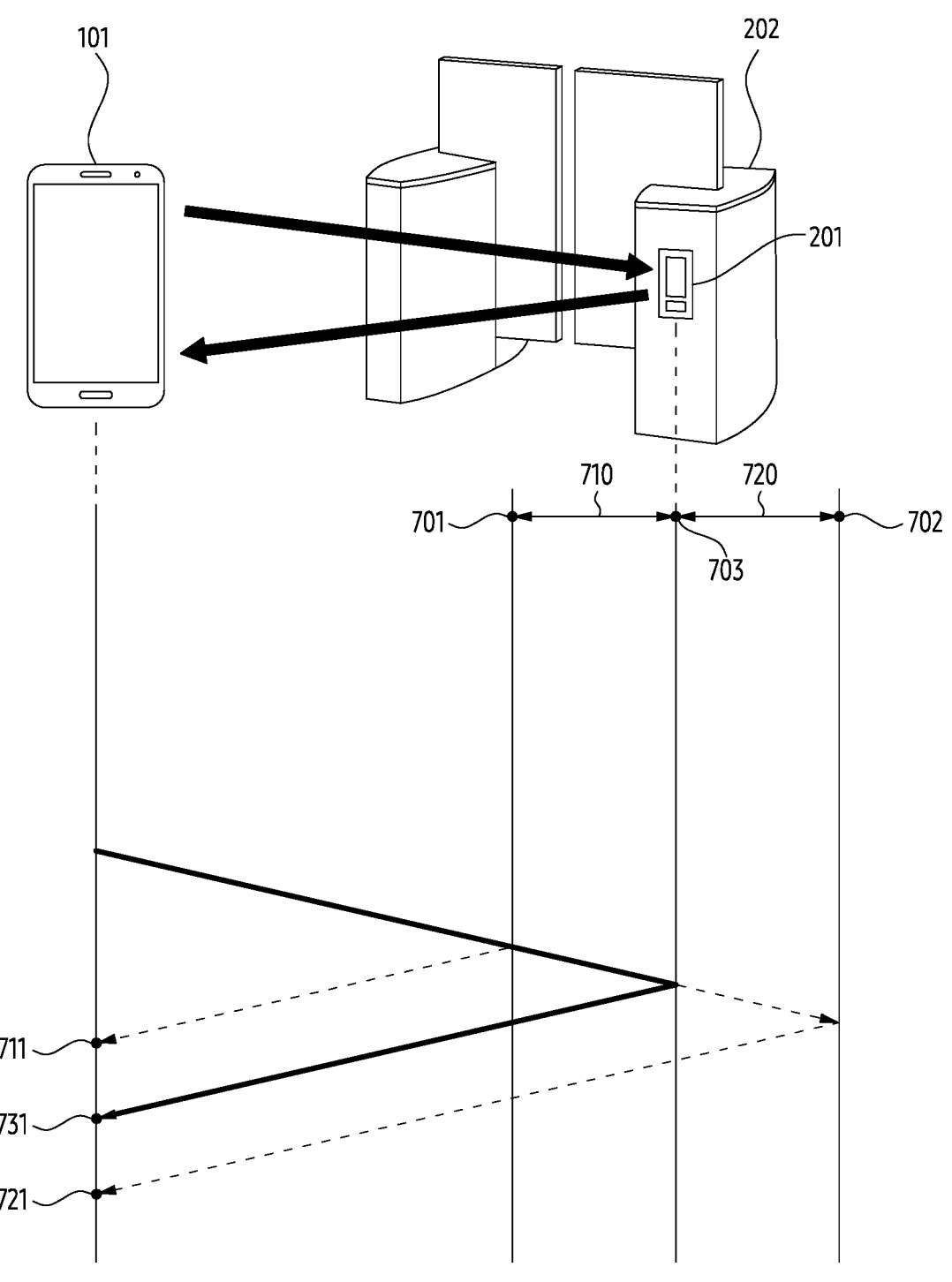
FIG. 7 illustrates an example of an operation of an electronic device for obtaining information on an external object according to an embodiment.

FIG. 7 illustrates an example of an operation of an electronic device for obtaining information on an external object according to an embodiment.

Referring to FIG. 7, the electronic device 101 may correspond to the electronic device 101 of FIGS. 2 and 3. The external electronic device 201 may correspond to the external electronic device 201 of FIG. 2. The external object 202 may correspond to the external object 202 of FIG. 2.

According to an embodiment, the processor 120 of the electronic device 101 may transmit an UWB signal (e.g., the second UWB signal of FIG. 6) to the external electronic device 201 in order to obtain information on the external object 202. The processor 120 may transmit an UWB signal, toward the external object 202 including the external electronic device 201 in order to obtain the information on the external object 202. The processor 120 may receive a reflected signal caused by the external object 202.

According to an embodiment, the processor 120 may set a first identified distance 710 and a second identified distance 720, based on the distance between the electronic device 101 and the external electronic device 201. For example, the processor 120 may identify a location spaced apart by the first identified distance 710 and the second identified distance 720 based on the location 703 of the external electronic device 201. The processor 120 may identify a first location 701 spaced apart by the first identified distance 710 based on the location 703 of the external electronic device 201. The processor 120 may identify a second location 702 spaced apart by the second identified distance 720 based on the location 703 of the external electronic device 201.

For example, the first identified distance 710 and the second identified distance 720 may be set substantially the same. The first location 701 may be set to be a location closer to the electronic device 101 in the locations spaced apart by the first identified distance 710 or the second identified distance 720 based on the location 703 of the external electronic device 201. The second location 702 may be set to be a location farther from the electronic device 101 among locations spaced apart by the first identified distance 710 or the second identified distance 720 based on the location 703 of the external electronic device 201.

The processor 120 may identify a first timing 711 at which the UWB signal is reflected and received at the first location 701. The processor 120 may identify a second timing 721 at which the UWB signal is reflected and received at the second location 702. The processor 120 may identify a third timing 731 in which the UWB signal is reflected and received from the location 703 of the external electronic device 201. The processor 120 may identify a time interval between the first timing 711 and the second timing 721 as the time interval for receiving the reflected signal of the UWB signal.

For example, the time interval for receiving the reflected signal of the UWB signal may be referred to as the time interval for processing the received reflected signal. The processor 120 may obtain reflected signals in a time interval wider than the time interval for receiving the reflected signal for the UWB signal. The processor 120 may process only the reflected signal received within the time interval for receiving the reflected signal. The processor 120 may identify channel impulse responses (CIR) of the received reflected signal within the time interval for receiving the reflected signal.

According to an embodiment, the information on the location 703 of the external electronic device 201 may include an error. Accordingly, the processor 120 may identify a time interval for receiving the reflected signal for the UWB signal transmitted to the external electronic device 201 by setting the first identified distance 710 and the second identified distance 720 based on the location 703 of the external electronic device 201.

A specific example of the reflected signal received within the identified time interval may be described with reference to FIGS. 8A and 8B.

Figure 8A:
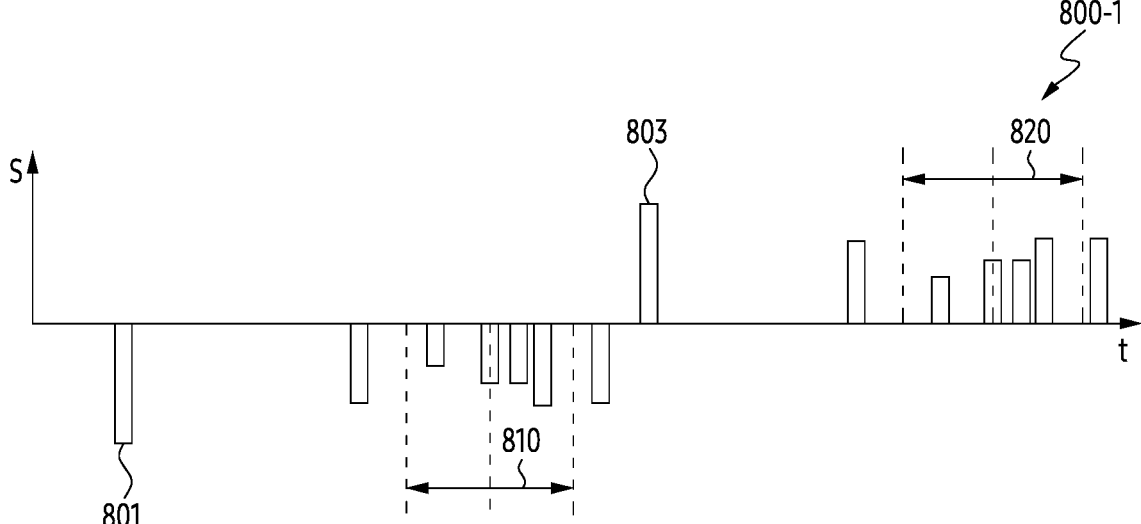
FIGS. 8A and 8B illustrate an UWB signal and a reflected signal for the UWB signal according to an embodiment.
Figure 8B:
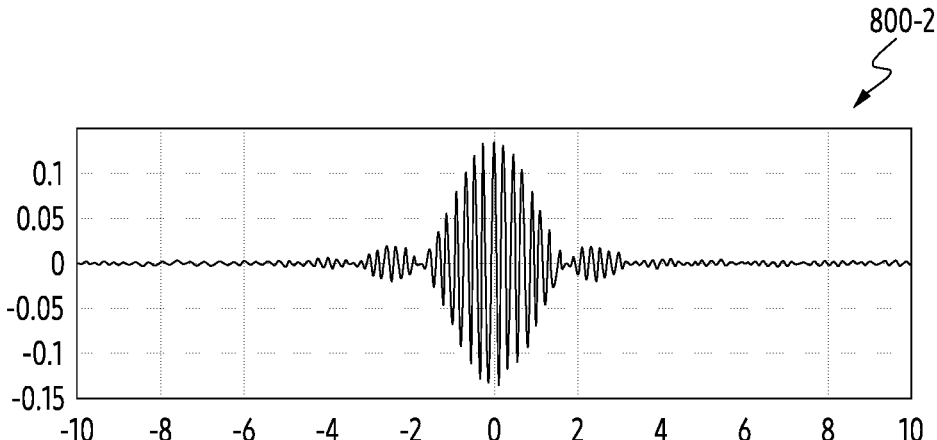

FIGS. 8A and 8B illustrate an UWB signal and a reflected signal for the UWB signal according to an embodiment.

Referring to FIG. 8A, a schematic diagram 800-1 shows the strength of an UWB signal 801 transmitted by the processor 120 and a reflected signal for the UWB signal 801 received by the processor 120 over time. The vertical axis of the schematic diagram 800-1 denotes the strength of the signal. The horizontal axis of the schematic diagram 800-1 denotes time.

Referring to FIG. 8B, a graph 800-2 is a graph illustrating a reflected signal received by the electronic device 101 over time. The graph 800-2 shows amplitude over time of the reflected signal for the UWB signal 801 received by the processor 120. The vertical axis of the graph 800-2 denotes signal strength, and the unit is volts. The horizontal axis of the graph 800-2 denotes time, and the unit is [ns]. For example, the processor 120 may receive a reflected signal of one UWB pulse. The processor 120 may identify a frequency shift due to the Doppler effect (or the Doppler frequency) in the reflected signal.

Referring to FIG. 8A, the processor 120 may transmit the UWB signal 801 to the external electronic device 201. The processor 120 may identify a first time interval 810 for receiving the reflected signal for the UWB signal 801. For example, the processor 120 may identify the first time interval 810, based on the distance between the electronic device 101 and the external electronic device 201. The processor 120 may identify information on the external object 202, by receiving the reflected signal within the first time interval 810 and processing the reflected signal received within the first time interval 810.

According to an embodiment, the processor 120 may periodically transmit an UWB signal to the external electronic device 201. For example, the processor 120 may transmit at least one signal to the external electronic device 201 at a designated time interval. For example, the processor 120 may transmit the UWB signal 803 after a designated time interval from the timing at which the UWB signal 801 is transmitted. The processor 120 may identify a second time interval 820 based on the information on the external object 202 (e.g., information on distance between the electronic device 101 and the external object 202). For an example, lengths of the first time interval 810 and the second time interval 820 may be set to be the same. As another example, lengths of the first time interval 810 and the second time interval 820 may be set differently from each other.

The processor 120 may identify the reflected signal received within the first time interval 810. The processor 120 may process only the reflected signal received within the first time interval 810, and disregard the reflected signal received outside the first time interval 810. For example, the processor 120 may analyze and process data on the reflected signal received within the first time interval 810.

Power consumption of the electronic device 101 may be reduced by processing only the reflected signal received within the first time interval 810 by the processor 120. Since the processor 120 processes only the reflected signal received within the first time interval 810, the processing time for the reflected signal may also be reduced.

For an example, the processor 120 may receive a plurality of signals during a continuous time interval from timing of transmitting the UWB signal 801 to timing of transmitting the UWB signal 803. The processor 120 may process only signals (e.g., reflected signals) received within the first time interval 810. The processor 120 may skip the operation for processing the signals received in a period outside the first time interval 810. The processor 120 may process only the signals received in the first time interval 810.

As another example, the processor 120 may receive only signals (e.g., reflected signals) transmitted within the first time interval 810. The processor 120 may not receive signals received outside the first time interval 810. The processor 120 may receive signals only within the first time interval 810 and process the received signals.

For an example, the processor 120 may identify a frequency shift due to the Doppler effect (or the Doppler frequency) in the reflected signals received within the first time interval 810. The processor 120 may identify a CIR for the reflected signals received within the first time interval 810. The processor 120 may perform fast Fourier transform (FFT) on the CIR. The processor 120 may identify information on movement of the electronic device 101 or information on movement of the external electronic device 201, based on the FFT for the CIR. The processor 120 may identify information on speed of the electronic device 101 or information on speed of the external electronic device 201. The processor 120 may identify information on relative speed of the external electronic device 201 based on the electronic device 101.

Figure 9:
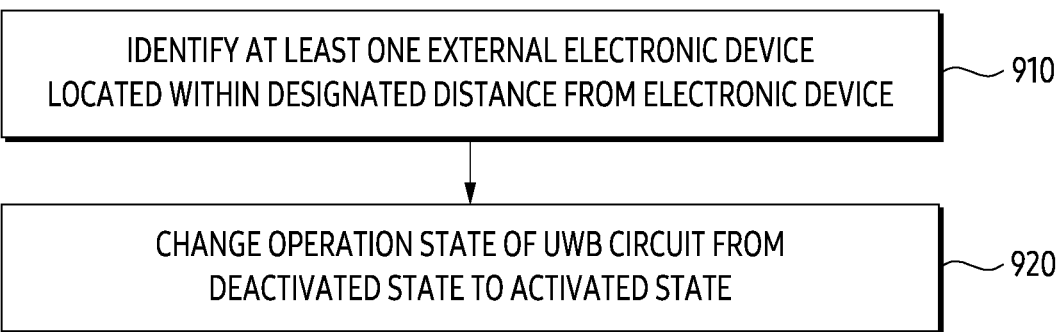
FIG. 9 is another flowchart illustrating an operation of an electronic device according to an embodiment.

FIG. 9 is another flowchart illustrating an operation of an electronic device according to an embodiment. This method may be executed by the electronic device 101 illustrated in FIGS. 2 and 3 the processor 120 of the electronic device 101.

Referring to FIG. 9, operations 910 to 920 may be performed before operation 610 of FIG. 6. In operation 910, the processor 120 may identify at least one external electronic device. The processor 120 may identify the at least one external electronic device located within a designated distance from the electronic device 101 via the communication circuit 320. For example, the designated distance may be set based on the type of communication performed via the communication circuit 320.

For example, the processor 120 may identify the at least one external electronic device located within the designated distance from the electronic device 101 via BLE communication. The processor 120 may identify the at least one external electronic device located within an identifiable distance via BLE communication.

As another example, the processor 120 may identify the at least one external electronic device located within the designated distance from the electronic device 101 via wireless LAN communication. The processor 120 may identify the at least one external electronic device located within an identifiable distance via wireless LAN communication.

In operation 920, the processor 120 may change the operation state of the UWB circuit from inactive to active. The processor 120 may change the operation state of the UWB circuit from the inactive state to the active state based on identifying the at least one external electronic device.

According to an embodiment, the processor 120 may identify the at least one external electronic device, and then identify that information on a signal received from one of the at least one external electronic device satisfies a designated condition. The processor 120 may change the operation state of the UWB circuit from the inactive state to the activated state based on that the information on the signal received from one of the at least one external electronic device satisfies the designated condition.

For example, the processor 120 may identify a received signal strength indication (RSSI) of a BLE signal received from one external electronic device in the at least one external electronic device. The processor 120 may change the operation state of the UWB circuit from the inactive state to the activated state, based on the fact that the RSSI of the BLE signal is identified to be equal to or greater than a designated value.

According to an embodiment, the processor 120 may identify, via the communication circuit 320, that the one external electronic device in the at least one external electronic device is located within a first distance from the electronic device 101. Based on the fact that the one external electronic device in the at least one external electronic device is located within the first distance from the electronic device 101, the processor 120 may change the operation state of the UWB circuit from the inactive state to the active state.

Meanwhile, by changing the operation state of the UWB circuit from the inactive state to the activated state, the processor 120 may identify information on the distance between the electronic device 101 and the one external electronic device in the at least one external electronic device via the UWB signal.

According to an embodiment, the processor 120 may identify distance between the electronic device 101 and the external electronic device based on one of three processes.

For example, the processor 120 may identify the distance between the electronic device 101 and the external electronic device based on a first process. The processor 120 may identify the distance (hereinafter, the first distance) between the electronic device 101 and the external electronic device, using the communication circuit 320.

In another example, the processor 120 may identify the distance between the electronic device 101 and the external electronic device, based on a second process. The processor 120 may identify the distance (hereinafter, the second distance) between the electronic device 101 and the external electronic device, based on transmitting an UWB signal to the external electronic device and receiving a response signal for the UWB signal from the external electronic device using the UWB circuit 310.

In another example, the processor 120 may identify the distance between the electronic device 101 and the external electronic device, based on a third process. The processor 120 may transmit an UWB signal to the external electronic device, using the UWB circuit and identify distance (hereinafter, the third distance) between the electronic device 101 and the external electronic device (or an external object including the external electronic device), based on the reflected signal of the UWB signal.

All of the above-described the first to third distances may represent the distance between the electronic device 101 and the external electronic device. However, each of the first to third distances may include an error with respect to an actual the distance between the electronic device 101 and the external electronic device. For example, the error range of the first distance may be set to be greater than the error range of the second distance and the error range of the third distance. The error range of the second distance may be set to be greater than the error range of the third distance. In other words, the error range of the first distance may be set to be the largest. The error range of the third distance may be set to be the smallest.

According to an embodiment, the power consumption of the electronic device 101 for identifying the first to third distances may be different from each other. For example, the power consumption of the electronic device 101 for identifying the first distance may be smaller than the power consumption of the electronic device 101 for identifying the second distance. The power consumption of the electronic device 101 for identifying the second distance may be less than the power consumption of the electronic device 101 for identifying the third distance. In other words, the power consumption of the electronic device 101 for identifying the first distance may be the smallest. The power consumption of the electronic device 101 for identifying the third distance may be the greatest.

Figure 10:
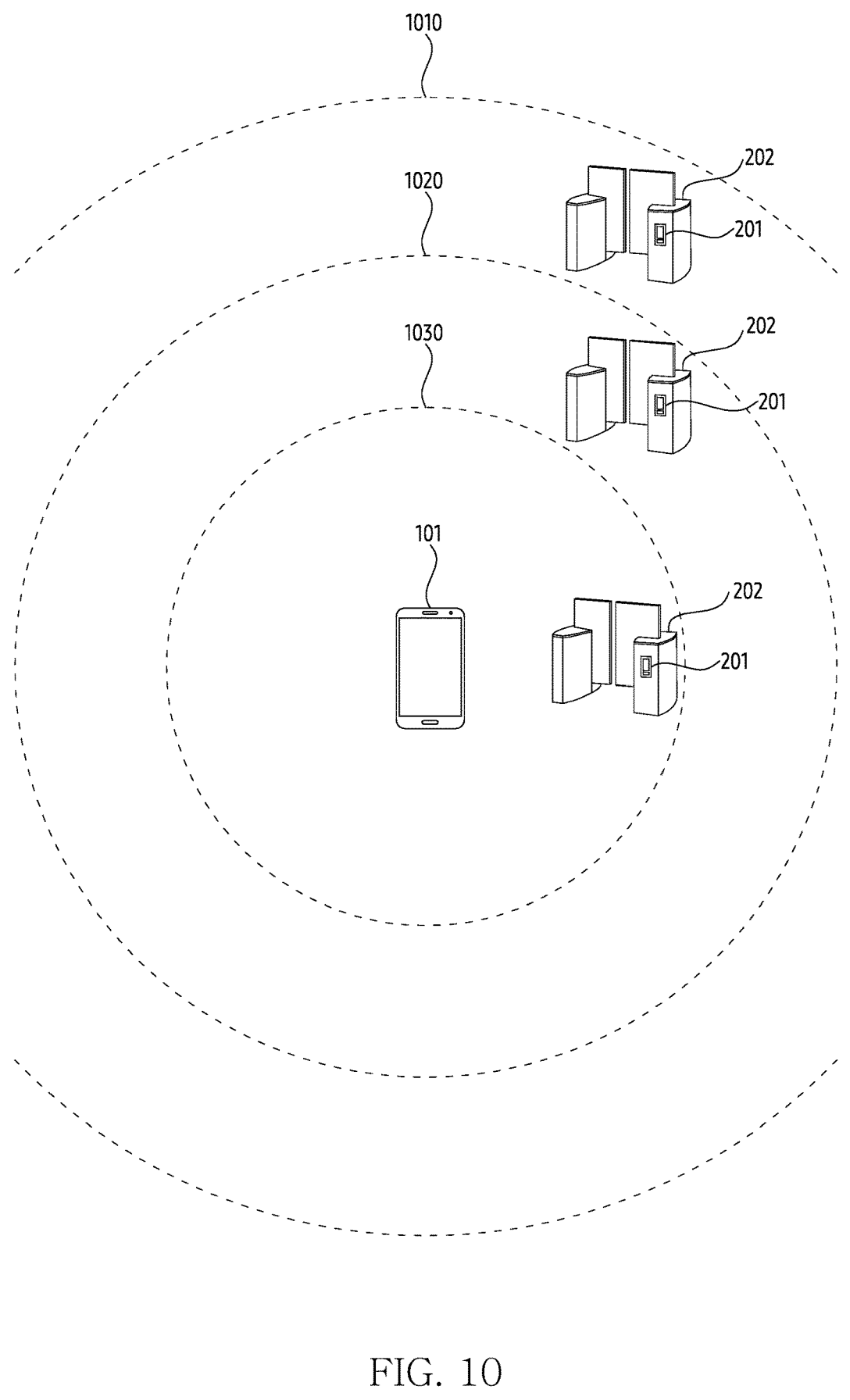

FIG. 10 illustrates an example of an operation of an electronic device based on a distance between an electronic device and an external electronic device according to an embodiment.

Referring to FIG. 10, the electronic device 101 may correspond to the electronic device 101 of FIGS. 2 and 3. The external electronic device 201 may correspond to the external electronic device 201 of FIG. 2. The external object 202 may correspond to the external object 202 of FIG. 2.

According to an embodiment, the processor 120 of the electronic device 101 may identify the distance between the electronic device 101 and the external electronic device 201 via one of three processes. The processor 120 may increasingly use more precise ways of identifying the distance between the electronic device 101 and the external electronic device 201 as the distance between the electronic device 101 and the external electronic device 201 decreases.

For example, the processor 120 may identify the distance between the electronic device 101 and the external electronic device 201, via at least one of the first to third processes. For an example, the processor 120 may identify the first distance between the electronic device 101 and the external electronic device 201 via the first process, based on the location of the external electronic device 201 being between a first radius 1010 and a second radius 1020. The processor 120 may identify the second distance between the electronic device 101 and the external electronic device 201 via the second process, based on the location of the external electronic device 201 being between the second radius 1020 and a third radius 1030. The processor 120 may identify the third distance between the electronic device 101 and the external electronic device 201 via the third process, based on the location of the external electronic device 201 being within the third radius 1030.

According to an embodiment, the processor 120 may stop the first process based on the location of the external electronic device 201 being between the second radius 1020 and the third radius 1030 and may perform the second process. The processor 120 may stop the second process and perform the third process based on the location of the external electronic device 201 being within the third radius 1030. According to an embodiment, the processor 120 may perform the first process within the first radius 1010. The processor 120 may perform the second process within the second radius 1020. The processor 120 may perform the third process within the third radius 1030.

The processor 120 may identify the external electronic device 201 within the radius 1010. The processor 120 may identify the first distance between the electronic device 101 and the external electronic device 201, based on the first process. The processor 120 may identify the first distance between the electronic device 101 and the external electronic device 201, using the communication circuit 320. The processor 120 may identify that the location of the external electronic device 201 has been moved within the second radius 1020, based on the first distance. Based on identifying that the external electronic device 201 is located within the second radius 1020 based on the electronic device 101, the processor 120 may change the operation state of the UWB circuit 310 from inactive to active.

For example, the processor 120 may identify the RSSI of the BLE signal received from the external electronic device 201 as greater than or equal to a designated value. The processor 120 may change the operation state of the UWB circuit 310 from the inactive state to the activated state, based on identifying the RSSI of the BLE signal received from the external electronic device 201 as a designated value or more.

Meanwhile, the processor 120 may identify the external electronic device 201 within the second radius 1020. The processor 120 may identify the second distance between the electronic device 101 and the external electronic device 201 based on the second process. The processor 120 may identify the second distance between the electronic device 101 and the external electronic device 201, using the UWB circuit 310. For example, the processor 120 may transmit an UWB signal to the external electronic device 201, using the UWB circuit 310. The processor 120 may receive a response signal for the UWB signal from the external electronic device 201. The processor 120 may identify the second distance between the electronic device 101 and the external electronic device 201, based on receiving the response signal for the UWB signal. Based on the second distance, the processor 120 may identify that the location of the external electronic device 201 has been moved within the third radius 1030 based on the electronic device 101. The processor 120 may transmit an UWB signal and identify a reflected signal of the UWB signal, based on identifying that the location of the external electronic device 201 has been moved within the third radius 1030 based on the electronic device 101.

Meanwhile, the processor 120 may identify the external electronic device 201 within the third radius 1030. The processor 120 may identify the third distance between the electronic device 101 and the external electronic device 201 based on the third process. The processor 120 may identify the third distance between the electronic device 101 and the external electronic device 201 using the UWB circuit 310. The processor 120 may transmit an UWB signal to the external electronic device 201 using the UWB circuit 310. The processor 120 may receive the reflected signal of the UWB signal, caused by the external object 202 including the external electronic device 201. The processor 120 may identify the reflected signal received by reflecting the UWB signal to the external object 202 including the external electronic device 201. The processor 120 may identify the third distance between the electronic device 101 and the external electronic device 201 using the reflected signal of the UWB signal.

According to an embodiment, the processor 120 may identify that the external electronic device 201 is not located within the third radius 1030. The processor 120 may identify external devices (e.g., external electronic device 201) located around the electronic device 101, when identifying that the external electronic device 201 is not located within the third radius 1030. For example, the processor 120 may set a reference radius based on identifying that the external electronic device 201 is not located within the third radius 1030. The processor 120 may transmit an UWB signal for identifying external devices located within the set reference radius and receive the reflected signal of the UWB signal.

Figure 11:
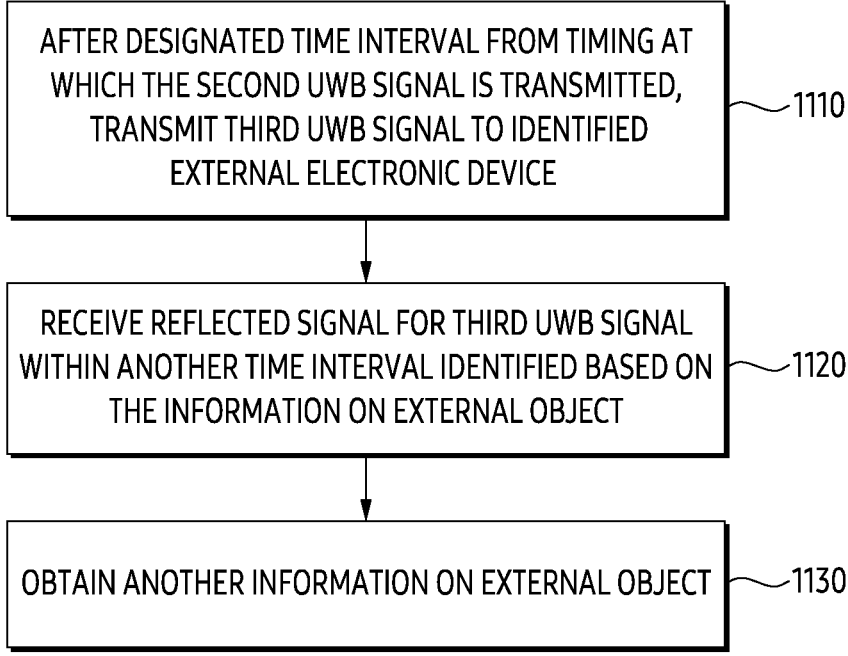
FIG. 11 is another flowchart illustrating an operation of an electronic device according to an embodiment.

FIG. 11 is another flowchart illustrating an operation of an electronic device according to an embodiment. This method may be executed by the electronic device 101 illustrated in FIGS. 2 and 3 and the processor 120 of the electronic device 101 illustrated in FIGS. 2 and 3.

Referring to FIG. 11, operations 1110 to 1130 may be performed after the operation 660 of FIG. 6. According to the operation 1110, the processor 120 may transmit a third UWB signal to the identified external electronic device after a designated time interval from timing at which the second UWB signal is transmitted.

According to an embodiment, after information on an external object (e.g., the external object 202 of FIG. 2) is obtained based on a reflected signal of the second UWB signal (e.g., the second UWB signal of FIG. 6), the information on the external object may be changed. For example, when the location of the electronic device 101 is changed, distance between the electronic device 101 and the external object may be changed. Accordingly, the information on the external object may be changed. In another example, when the location of the external object is changed, the distance between the electronic device 101 and the external object may be changed. Accordingly, the information on the external object may be changed.

According to an operation 1120, the processor 120 may receive a reflected signal of the third UWB signal within another time interval identified based on the information on the external object.

The processor 120 may identify another time interval based on the information on the external object. The other time interval may be distinct from the time interval for receiving the second UWB signal.

For example, the processor 120 may identify another time interval based on information on the distance between the electronic device 101 and the external object. The processor 120 may receive the reflected signal of the third UWB signal in a shorter time interval when the distance between the electronic device 101 and the external object decreases. The processor 120 may receive the reflected signal for the third UWB signal in a longer time interval when the distance between the electronic device 101 and the external object increases.

According to another embodiment, the time interval for receiving the second UWB signal and the time interval for receiving the third UWB signal may be set as fixed time intervals. For example, the reflected signal of the second UWB signal or the reflected signal of the third UWB signal may be received within fixed time intervals, regardless of the distance between the electronic device 101 and the external object (or the external electronic device).

According to an operation 1130, the processor 120 may obtain other information on the external object. The processor 120 may obtain other information on the external object based on the reflected signal of the third UWB signal.

The other information on the external object obtained based on the reflected signal of the third UWB signal may be distinct to information on the external object obtained based on the reflected signal of the second UWB signal. For example, the other information on the external object obtained based on the reflected signal of the third UWB signal may include changed information on the external object. For an example, when the distance between the electronic device 101 and the external object is changed, the processor 120 may obtain information on the changed distance between the electronic device 101 and the external object. In another example, when a shape of the external object is changed, the processor 120 may obtain information on the changed shape of the external object.

Meanwhile, the processor 120 may identify information on movement of the external object, based on the information on the external object and other information on the external object. For example, the information on the external object may include information on the first location where the external object is located. The other information on the external object may include information on the second location where the external object is located. The processor 120 may identify that the external object has been moved from the first location to the second location based on the information on the external object and the other information on the external object.

According to an embodiment, the processor 120 may periodically identify information on the external object including the external electronic device. For example, the processor 120 may transmit the third UWB signal to the external electronic device after a designated time interval from timing at which the second UWB signal is transmitted. The processor may transmit at least one UWB signal to the external electronic device at a designated time interval, from the timing at which the third UWB signal is transmitted.

According to an embodiment, the processor 120 may obtain information on the external object by transmitting at least one UWB signal, at a designated time interval. The processor 120 may identify information on the distance between at least one external electronic device and the electronic device 101, while obtaining the information on the external object by setting the designated time interval as a period. For example, the processor 120 may identify information on the distance between the at least one external electronic device and the electronic device 101 by setting a period corresponding to a period at which at least one UWB signal is transmitted. In other words, the processor 120 may obtain information on the external object at a designated time interval. The processor 120 may identify information on the distance between the at least one external electronic device and the electronic device 101 at a designated time interval.

For example, the operation of the processor 120 for obtaining information on the external object may be referred to as a first session. The operation of the processor 120 for identifying information on the distance between the at least one external electronic device and the electronic device 101 may be referred to as a second session to an N-th session. The processor 120 may form the first to N-th sessions as one block. The processor 120 may perform the sessions of the block at a designated time interval. The first to N-th sessions may be performed by the processor 120 at different timings, respectively.

FIG. 12 illustrates an example of an operation of an electronic device operating at a designated time interval according to an embodiment.

Referring to FIG. 12, at least one external electronic device may include a first external electronic device, a second external electronic device, and/or a third external electronic device. The processor 120 may transmit a first UWB signal for identifying information on a first external object including the first external electronic device and receive a reflected signal of the first UWB signal. The processor 120 may identify information on the first external object, based on the reflected signal of the first UWB signal. The operation of the processor 120 for identifying information on the first external object may be referred to as a first session 1201.

After the first session 1201 is performed, the processor 120 may transmit a second UWB signal for identifying the distance between the second external electronic device and the electronic device 101 and receive a response signal for the second UWB signal from the second external electronic device. The processor 120 may identify the distance between the second external electronic device and the electronic device 101 based on the response signal to the second UWB signal. The operation of the processor 120 for identifying the distance between the second external electronic device and the electronic device 101 may be referred to as a second session 1202.

After the second session 1202 is performed, the processor 120 may transmit a third UWB signal for identifying the distance between the third external electronic device and the electronic device 101 and receive a response signal for the third UWB signal from the third external electronic device. The processor 120 may identify the distance between the third external electronic device and the electronic device 101, based on the response signal to the third UWB signal. The operation of the processor 120 for identifying the distance between the third external electronic device and the electronic device 101 may be referred to as a third session 1203.

For example, the first session may refer to a session for identifying information on the first external object including the first external electronic device by identifying a reflected signal of an UWB signal. The second session and the third session may refer to a session for identifying the distance between the second external electronic device and the electronic device 101 and the distance between the third external electronic device and the electronic device 101, respectively, by transmitting an UWB signal and receiving a response signal.

The processor 120 may form the first session 1201 to the third session 1203 as one block 1210. The processor 120 may perform sessions of the block 1210 at a designated time interval 1220. For example, each of the first to third sessions 1201 to 1203 may be performed by the processor 120 at the designated time interval 1220, respectively. The first to third sessions 1201 to 1203 may be performed by the processor 120 at different timings, respectively.

Figure 13:
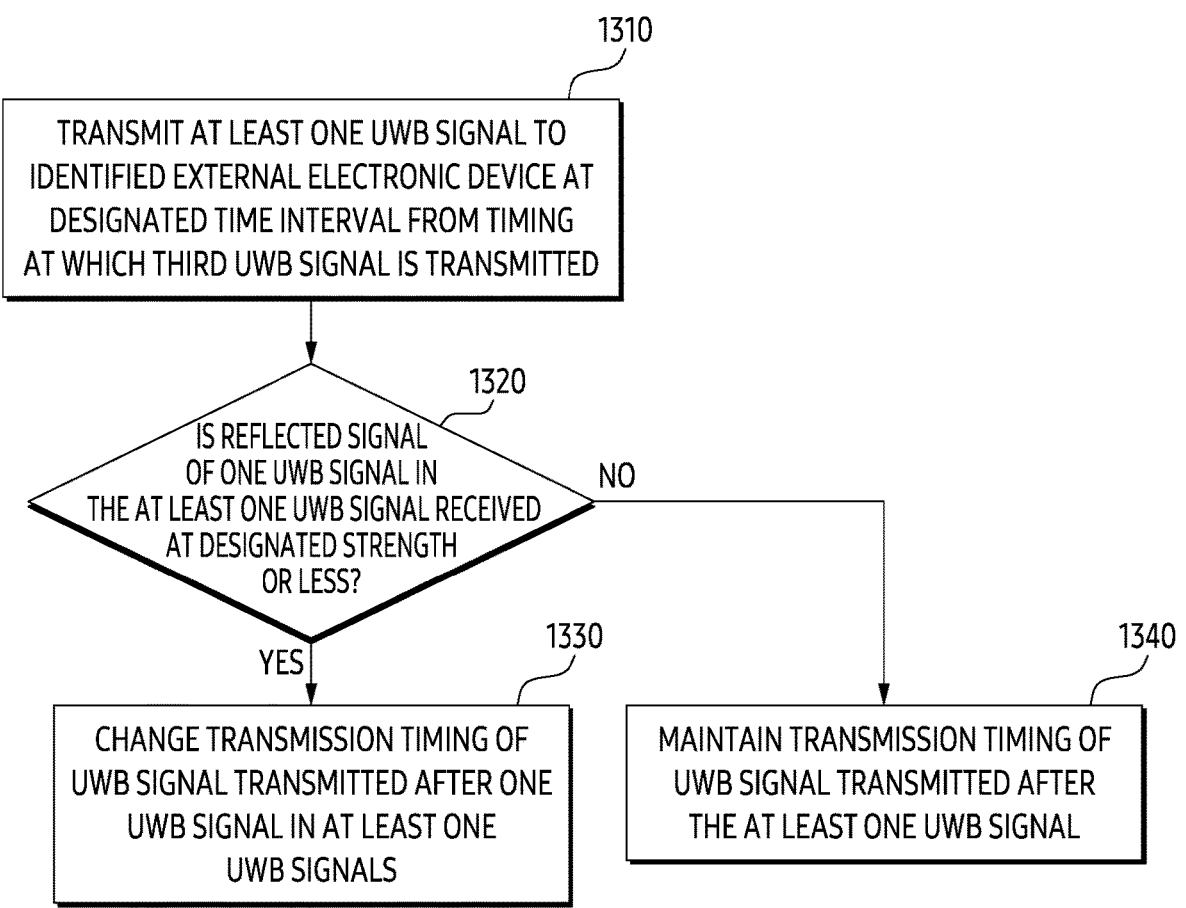
FIG. 13 is another flowchart illustrating an operation of an electronic device according to an embodiment.

FIG. 13 is another flowchart illustrating an operation of an electronic device according to an embodiment. This method may be executed by the electronic device 101 and the processor 120 of the electronic device 101 illustrated in FIGS. 2 and 3.

Referring to FIG. 13, operations 1310 to 1340 may be performed after the operation 1130 of FIG. 11. In operation 1310, the processor 120 may transmit at least one UWB signal to the identified external electronic device. The processor 120 may transmit the at least one UWB signal to the identified external electronic device at a designated time interval from timing at which the third UWB signal is transmitted.

In operation 1320, the processor 120 may identify whether a reflected signal of one UWB signal in the at least one UWB signal is received at a designated strength or less.

For example, the processor 120 may receive at least one reflected signal of the one UWB signal in the at least one UWB signal, while transmitting the at least one UWB signal at a designated time interval. The processor 120 may identify whether the reflected signal of one UWB signal in the at least one UWB signal is received at a designated strength or less. For an example, the processor 120 may identify whether the RSSI of the reflected signal of one UWB signal in the at least one UWB signal is identified to be smaller than a reference RSSI.

In operation 1330, when the reflected signal of one UWB signal in the at least one UWB signals is received at a designated strength or less, the processor 120 may change the transmission timing of an UWB signal transmitted after one UWB signal in the at least one UWB signals transmitted in operation 1310. Based on the fact that the reflected signal of the one UWB signal is received below the designated strength, the processor 120 may change the transmission timing of an UWB signal transmitted after one UWB signal among the at least one UWB signal. After changing the transmission timing of the UWB signal transmitted after one UWB signal among the at least one UWB signal, the processor 120 may transmit a remaining UWB signal at the changed timing.

For example, the processor 120 may identify that the reflected signal of one UWB signal in the at least one UWB signal is received at the designated strength or less. The processor 120 may identify that one UWB signal in the at least one UWB signal collides with an external signal based on the fact that the reflected signal of the one UWB signal is received below the designated strength. The processor 120 may change the transmission timing of an UWB signal transmitted after one UWB signal among the at least one UWB signal in order to avoid further collision.

In operation 1340, when the reflected signal of one UWB signal in the at least one UWB signal is not received at the designated strength or less, the processor 120 may maintain the transmission timing of the UWB signal transmitted after the at least one UWB signal. The processor 120 may maintain the transmission timing of the UWB signal transmitted after the UWB signal of the at least one UWB signal, based on the fact that the reflected signal for one UWB signal is not received at the designated strength or less. For example, the processor 120 may transmit an UWB signal transmitted after one of the at least one UWB signal after a designated time interval elapses from the transmission timing of one UWB signal in the at least one UWB signal.

Figure 14:
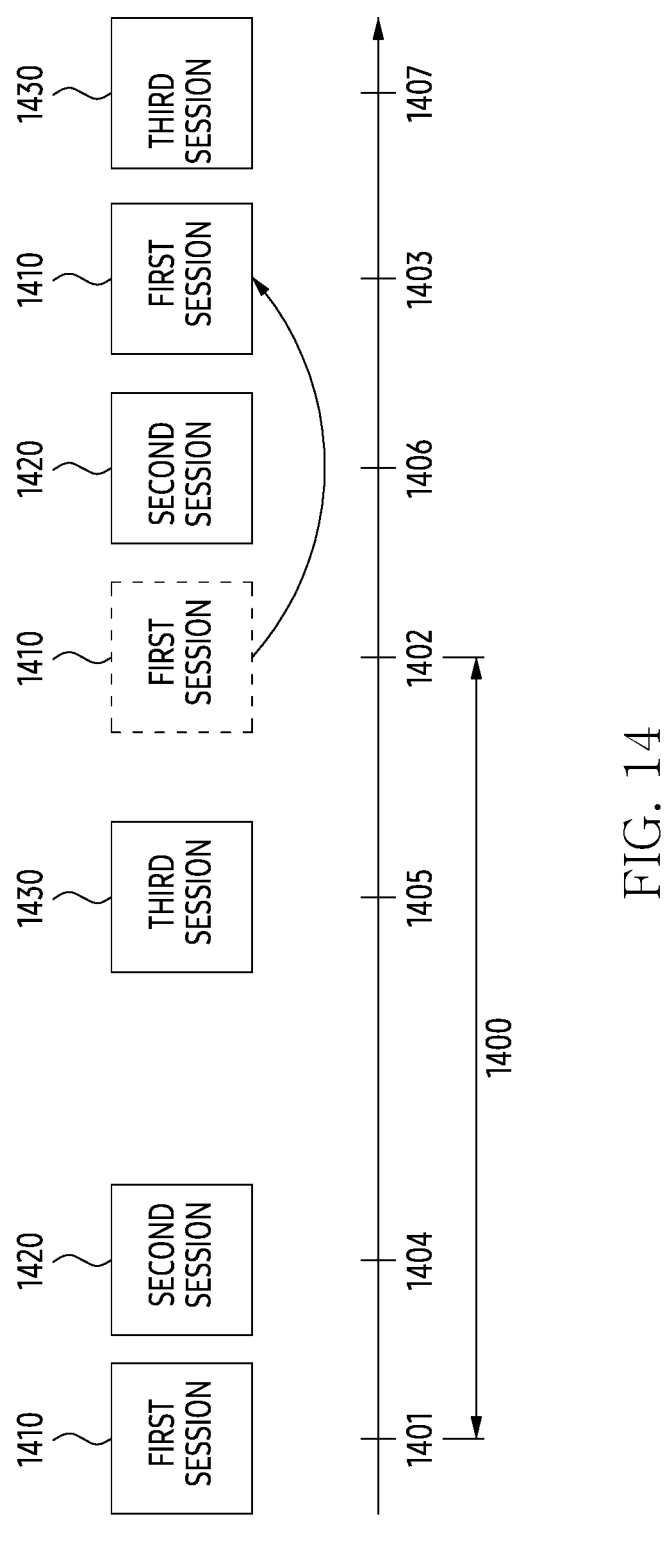
FIG. 14 illustrates another example of an operation of an electronic device operating at a designated time interval according to an embodiment.

FIG. 14 illustrates another example of an operation of an electronic device operating at a designated time interval according to an embodiment.

Referring to FIG. 14, at least one external electronic device may include a first external electronic device, a second external electronic device, and/or a third external electronic device.

The processor 120 may identify information on the first external object including the first external electronic device by transmitting a first UWB signal and receiving a reflected signal of the first UWB signal. The operation of the processor 120 for identifying information on the first external object may be referred to as a first session 1410. The first session 1410 may be performed at timing 1401. The timing 1401 at which the first session 1410 is performed may correspond to timing at which the first UWB signal of the first session 1410 is transmitted.

After the first session 1410 is performed, the processor 120 may identify distance between the second external electronic device and the electronic device 101 signal by transmitting a second UWB and receiving a response signal for the second UWB signal from the second external electronic device. The operation of the processor 120 for identifying the distance between the second external electronic device and the electronic device 101 may be referred to as a second session 1420. The second session 1420 may be performed at timing 1404. The timing 1402 at which the second session 1420 is performed may correspond to timing at which the second UWB signal of the second session 1420 is transmitted.

After the second session 1420 is performed, the processor 120 may identify distance between the third external electronic device and the electronic device 101 by transmitting a third UWB signal and receiving a response signal for the third UWB signal from the third external electronic device. The operation of the processor 120 for identifying the distance between the third external electronic device and the electronic device 101 may be referred to as a third session 1430. The third session 1430 may be performed at timing 1405. The timing 1405 at which the third session 1430 is performed may correspond to timing at which the third UWB signal of the third session 1430 is transmitted.

According to an embodiment, the first session 1410 to the third session 1430 may be performed at a designated time interval 1400, which may be referred to as a period. The first session 1410 may be performed at the designated time interval 1400 as a period. The second session 1420 may be performed at the designated time interval 1400 as a period. The third session 1430 may be performed at the designated time interval 1400 as a period.

According to an embodiment, in the first session 1410 performed at the timing 1401, the processor 120 may identify that the reflected signal of the first UWB signal is received at a designated strength or less. The processor 120 may identify that the first UWB signal has a collision with the external signal, based on the fact that the reflected signal for the first UWB signal is received below the designated strength.

According to an embodiment, the processor 120 may not perform the first session 1410 at the timing 1402 after the designated time interval 1400 has elapsed from the timing 1401, based on identifying that the first UWB signal has collided with an external signal. The processor 120 may change the timing at which the first session 1410 is performed, based on identifying that the first UWB signal has a collision with the external signal. For example, the processor 120 may change the timing at which the first session 1410 is performed, from the timing 1402 to the timing 1403. Accordingly, the processor 120 may change the transmission timing of an UWB signal with respect to the first session 1410, which is transmitted after the first UWB signal transmitted at the timing 1401, from the timing 1402 to the timing 1403.

FIG. 14 illustrates an example in which the processor 120 changes the timing at which the first session 1410 is performed between the timing 1406 at which the second session 1420 is performed and the timing 1407 at which the third session 1430 is performed, but it is not limited thereto. The processor 120 may change the timing at which the first session 1410 is performed to various timings. For example, the processor 120 may perform the first session 1410, after the second session 1420 and the third session 1430 are performed.

According to an embodiment, the processor 120 may change all timings at which the first session 1410 to the third session 1430 are performed, based on identifying that the first UWB signal collides with an external signal.

According to an embodiment, the processor 120 may change the length of the designated time interval 1400, based on identifying that the first UWB signal has a collision with the external signal.

Figure 15:
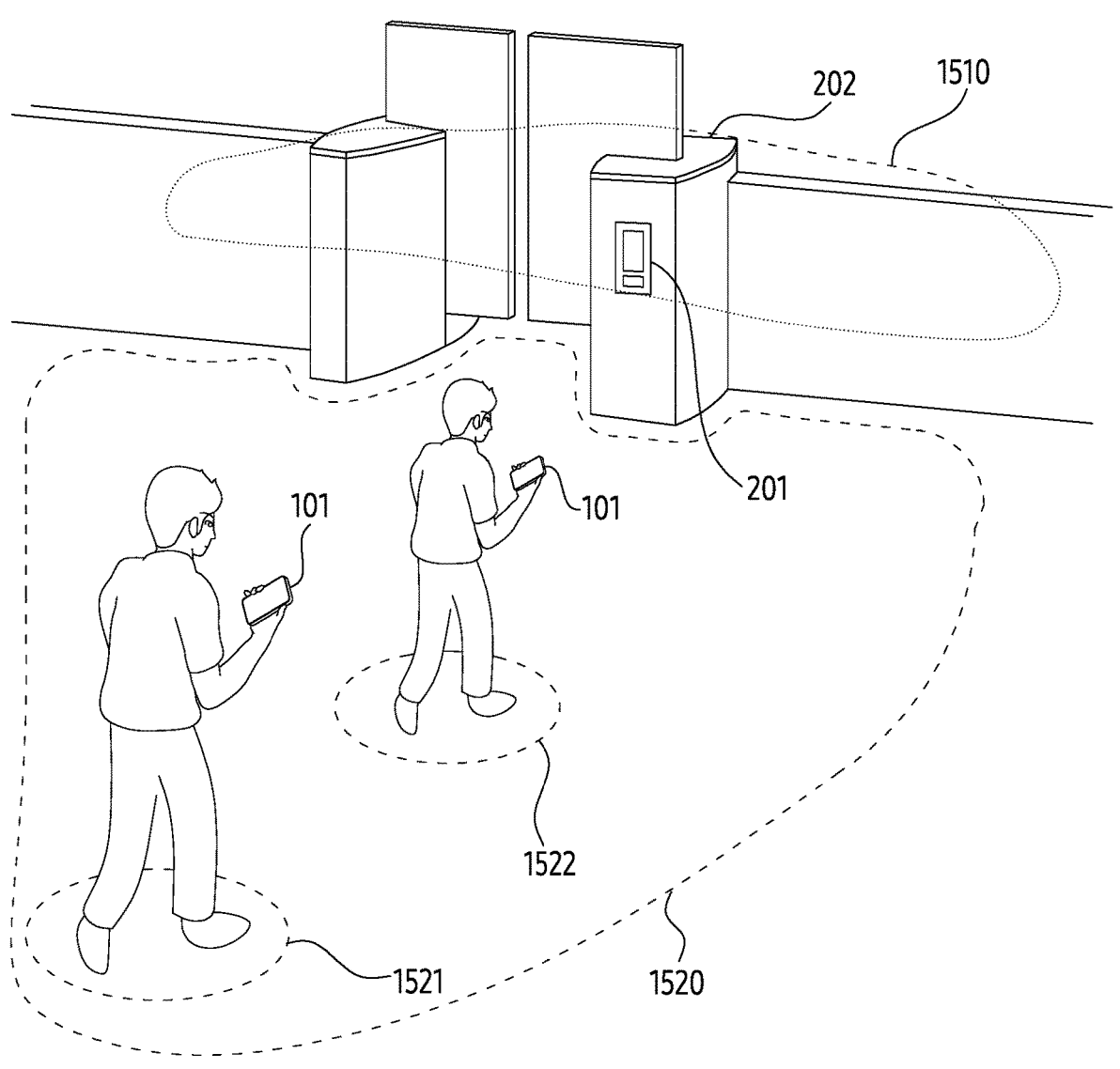
FIG. 15 illustrates another example of an operation of an electronic device for controlling an external electronic device based on movement of the electronic device according to an embodiment.

FIG. 15 illustrates another example of an operation of an electronic device for controlling an external electronic device based on movement of the electronic device according to an embodiment.

Referring to FIG. 15, the electronic device 101 may correspond to the electronic device 101 of FIGS. 2 and 3. The external electronic device 201 may correspond to the external electronic device 201 of FIG. 2. The external object 202 may correspond to the external object 202 of FIG. 2.

The processor 120 may identify information on the external object 202 including the external electronic device 201. For example, the processor 120 may transmit an UWB signal to the external electronic device 201 and identify the information on the external object 202, based on the reflected signal of the UWB signal.

For example, the information on the external object 202 may include information on the distance between the electronic device 101 and the external object 202. The processor 120 may identify the information on the distance between the electronic device 101 and the external object 202.

According to an embodiment, the processor 120 may obtain data via at least one sensor 330. For example, the at least one sensor 330 may include an acceleration sensor or a gyro sensor. The processor 120 may obtain information on the movement of the electronic device 101, based on data obtained via the at least one sensor 330. The processor 120 may identify information on the location of the electronic device 101 based on the information on the external object 202 and the information on movement of the electronic device 101. For example, the processor 120 may identify that the electronic device 101 moves from a first location 1521 to a second location 1522 closer to the external object 202, based on the information on the external object 202 and the information on movement of the electronic device 101.

According to an embodiment, the information on the external object 202 may include the information on the movement of the electronic device 101. The processor 120 may use data obtained via the at least one sensor 330 to supplement (or reinforce) the information on movement of the electronic device 101.

According to an embodiment, the processor 120 may identify that the electronic device 101 may access the external object 202 (or the external electronic device 201) based on the information on the location of the electronic device 101. For example, the processor 120 may identify that distance between the electronic device 101 and the external object 202 (or external electronic device 201) is within a designated distance based on the information on the location of the electronic device 101.

The processor 120 may transmit a request signal for controlling the external object 202 to the external electronic device 201 based on the electronic device 101 accessing the external object 202. The external electronic device 201 may transmit a control signal for controlling the external object 202 to the external object 202 based on the request signal.

For example, the external object 202 may include a blocking device for restricting access to a designated geographic area 1510. The external object 202 may include a blocking device for restricting access to the designated geographic area 1510 for external devices located in the geographic area 1520. The processor 120 may transmit a request signal for controlling the blocking device to the external electronic device 201, when the electronic device 101 is accessing the external object 202. For example, the request signal for controlling the blocking device may include authentication information of the electronic device 101 registered in the external electronic device 201. The external electronic device 201 may obtain the authentication information of the electronic device 101 based on the request signal. The external electronic device 201 may control the blocking device included in the external object 202 based on the authentication information of the electronic device 101.

FIG. 15 illustrates an external object 202 including a blocking device as a gate, but is not limited thereto. The external object 202 may be various devices (or objects) including a blocking device. For example, the external object 202 may include a car or a window.

According to an embodiment, the processor 120 may transmit a request signal for access to the external object 202, based on the electronic device 101 accessing the external object 202. For example, the external object 202 may include notebook or desktop. The processor 120 may transmit the request signal for unlocking the external object 202 to the external electronic device 201 included in the external object 202, based on the electronic device 101 accessing the external object 202. The external electronic device 201 may unlock the external object 202 based on the request signal.

An electronic device (e.g., the electronic device 101 of FIG. 3) according to an embodiment may comprise an ultra wide band (UWB) circuit (e.g., the UWB circuit 310 of FIG. 3) and at least one processor (e.g., the processor 120 of FIG. 3) operatively coupled with the UWB circuit, wherein the at least one processor may be configured to receive a response signal, via the UWB circuit, from at least one external electronic device, based on a first UWB signal transmitted to the at least one external electronic device from the electronic device, based on the response signal, identify information on distance between the at least one external electronic device and the electronic device, based on the information on the distance between the at least one external electronic device and the electronic device, identify an external electronic device in the at least one external electronic device located within a reference distance from the electronic device, transmit a second UWB signal via the UWB circuit, toward the identified external electronic device, receive a reflected signal of the second UWB signal caused by an external object including the identified external electronic device, within a time interval identified based on a distance between the electronic device and the identified external electronic device, and based on the reflected signal, obtain information on the external object.

According to an embodiment, the at least one processor may be configured to transmit a third UWB signal, to identified external electronic device, after designated time interval from a timing at which the second UWB signal is transmitted, receive a reflected signal of the third UWB signal, caused by the external object, within another time interval identified based on the information on the external object, and based on the reflected signal of the third UWB signal, obtain other information on the external object.

According to an embodiment, the at least one processor may be further configured to transmit at least one additional UWB signal, to the identified external electronic device, after the designated time interval from a timing at which the third UWB signal is transmitted.

According to an embodiment, the at least one processor may be further configured to identify that a reflected signal of the at least one additional UWB signal is received below a designated strength, and change transmission timing of one or more subsequent UWB signals transmitted after the at least one additional UWB signal, based on identifying that the reflected signal of the at least one additional UWB signal is received below the designated strength.

According to an embodiment, the at least one processor may be further configured to identify information on a movement of the external object, based on the information on the external object and the other information on the external object.

According to an embodiment, the electronic device further comprise a communication circuit for radio access technology (RAT) distinct from UWB, and the at least one processor may be further configured to identify whether the at least one external electronic device is located within a designated distance from the electronic device, via the communication circuit, and change an operating state of the UWB circuit from inactive to active, based on identifying that the at least one external electronic device is located within the designated distance from the electronic device.

According to an embodiment, the electronic device further comprise at least one sensor (e.g., at least one sensor 330 of FIG. 3), and the at least one processor may be further configured to identify information on direction of movement of the electronic device, based on data obtained via the at least one sensor, identify information on a location of the electronic device, based on the information on the external object and on the direction of movement of the electronic device, and change the identified time interval, based on the information on the location of the electronic device.

According to an embodiment, the at least one processor may be further configured to identify that the electronic device is approaching to the external object based on the information on location of the electronic device, and transmit a request signal for controlling the external object to the identified external electronic device based on identifying that the electronic device is approaching the external object.

According to an embodiment, the external object includes a blocking device for restricting access to a designated geographic area, the request signal includes a request for controlling the blocking device, and the request signal for controlling the blocking device may include authentication information of the electronic device registered in the identified external electronic device.

According to an embodiment, the electronic device further comprises a plurality of antennas including a first antenna (e.g., the first antenna 421 of FIG. 4) and a second antenna (e.g., the first antenna 422 of FIG. 4), and wherein the first antenna and the second antenna may configure as omnidirectional antenna.

According to an embodiment, the at least one processor may be configured to transmit the second UWB signal to the identified external electronic device, using the first antenna, and receive the reflected signal of the second UWB signal within the identified time interval, using the second antenna.

According to an embodiment, the plurality of antennas may include at least one antenna (e.g., at least one antenna 430 of FIG. 4) configured as a directional antenna.

According to an embodiment, the at least one processor is configured to identify the information on the distance between the at least one external electronic device and the electronic device, using the first antenna and the at least one antenna.

According to an embodiment, the response signal may include information on a delay for transmitting the response signal, and the at least one processor may be configured to identify a timing at which the first UWB signal is transmitted, and identify information on a location for the at least one external electronic device, based on information on the timing at which the first UWB signal is transmitted, a timing at which the response signal is received, and the delay for transmitting the response signal.

According to an embodiment, the at least one processor may be configured to obtain the information on the external object, based on another time interval from a timing at which the second UWB signal is transmitted, to a timing at which the reflected signal of the second UWB signal is received.

According to an embodiment, the information on the external object may include information on a shape of the external object and information on a distance between the electronic device and the external object.

According to an embodiment, the identified external electronic device may be closest to the electronic device in the at least one external electronic device.

According to an embodiment, the second UWB signal may be implemented as a single pulse waveform.

A method of an electronic device (e.g., the electronic device 101) according to an embodiment may comprise an operation of receiving a response signal, based on a first UWB signal transmitted from an electronic device to at least one external electronic device, from the at least one external electronic device via an UWB circuit included in the electronic device, an operation of identifying information on a distance between the at least one external electronic device and the electronic device, based on the response signal, an operation of identifying an external electronic device in the at least one external electronic device located within a reference distance from the electronic device, based on the information on the distance between the at least one external electronic device and the electronic device, an operation of transmitting a second UWB signal to the identified external electronic device via the UWB circuit toward the identified external electronic device, an operation of receiving the reflected signal of the second UWB signal, within a time interval identified based on a distance between the electronic device and the identified external electronic device, caused by an external object including the identified external electronic device and based on the reflected signal, an operation of obtaining information on the external object.

According to an embodiment, a non-transitory computer readable storage medium stores one or more programs, and the one or more programs may include instructions, which, when being executed by at least one processor of an electronic device, cause the electronic device to receive a response signal, based on a first UWB signal transmitted from the electronic device (e.g., the electronic device 101) to at least one external electronic device, from the at least one external electronic device via an UWB circuit, identify information on a distance between the at least one external electronic device and the electronic device, based on the response signal, identify an external electronic device in the at least one external electronic device located within reference distance from the electronic device, based on the information on the distance between the at least one external electronic device and the electronic device, transmit a second UWB signal via the UWB circuit, toward the identified external electronic device, receive a reflected signal of the second UWB signal, caused by an external object including the identified external electronic device, within a time interval identified based on a distance between the electronic device and the identified external electronic device, and based on the reflected signal, obtain information on the external object.

The electronic device according to an embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with an embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiments, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:

ultra wide band (UWB) circuitry;

communication circuitry for radio access technology (RAT) distinct from UWB, memory comprising one or more storage media, storing instructions; and at least one processor comprising processing circuitry, wherein the instructions, when executed by the at least one processor individually or collectively, cause the electronic device to:

identify that, via the communication circuitry, a strength of a signal transmitted from one of at least one external electronic device is greater than a reference strength, based on identifying that the strength of a signal transmitted from one of the at least one external electronic device is greater than the reference strength, allocate, for each of e ast one external electronic device, at least one time section periodically allocated in a reference period, wherein a time section is allocated for a corresponding one of the at least one external electronic device, transmit a first UWB signal to the at least one external electronic device, wherein the first UWB signal is transmitted in the at least one time section, based on transmitting the first UWB signal, receive a response signal, via the activated UWB circuitry, from the at least one external electronic device, based on the response signal received from each of the at least one external electronic device, identify distance information between the at least one external electronic device and the electronic device, based on the distance information between the at least one external electronic device and the electronic device, identify, among the at least one external electronic device, an external electronic device in an external object located within a reference distance from the electronic device, transmit a second UWB signal via the UWB circuitry, toward the identified external electronic device, receive a reflection of the second UWB signal, wherein the reflection of the second UWB signal is a radio signal that echoes from the external object within a time interval identified based on a distance between the electronic device and the identified external electronic device, based on the reflection, obtain information on the external object and transmitting a request signal to the external object for controlling a function of the external object based on the information on the external object.

2. The electronic device of claim 1, wherein the instructions, when executed by the at least one processor individually or collectively, cause the electronic device to:

transmit a third UWB signal, to identified external electronic device, after a designated time interval from a timing at which the second UWB signal is transmitted, receive a reflected signal of the third UWB signal, caused by the external object, within another time interval identified based on the information on the external object, and based on the reflected signal of the third UWB signal, obtain other information on the external object.

3. The electronic device of claim 2, wherein the instructions, when executed by the at least one processor individually or collectively, cause the electronic device to transmit at least one additional UWB signal to the identified external electronic device, after the designated time interval from a timing at which the third UWB signal is transmitted.

4. The electronic device of claim 3, wherein the instructions, when executed by the at least one processor individually or collectively, cause the electronic device to:

identify that a reflected signal of one UWB signal among the at least one UWB signal is received below a designated strength, and change transmission timing of a UWB signal transmitted after the one UWB signal among the at least one UWB signal, based on identifying that the reflected signal is received below the designated strength.

5. The electronic device of claim 2, wherein the instructions, when executed by the at least one processor individually or collectively, cause the electronic device to identify information on a movement of the external object, based on the information on the external object and the other information on the external object.

6. The electronic device of claim 1, wherein the instructions, when executed by the at least one processor individually or collectively, cause the electronic device to:

based on identifying that the strength of a signal transmitted from one of the at least one external electronic device is greater than the reference strength, identify that the at least one external electronic device is located within a designated distance from the electronic device, and based on identifying that the at least one external electronic device is located within the designated distance from the electronic device, activate the UWB circuitry.

7. The electronic device of claim 1, further comprising:

at least one sensor, wherein the instructions, when executed by the at least one processor individually or collectively, cause the electronic device to:

identify information on direction of movement of the electronic device, based on data obtained via the at least one sensor, identify information on a location of the electronic device, based on the information on the external object and the direction of movement of the electronic device, and change the identified time interval, based on the information on the location of the electronic device.

8. The electronic device of claim 7, wherein the instructions, when executed by the at least one processor individually or collectively, cause the electronic device to:

identify that the electronic device is approaching the external object based on the information on the location of the electronic device, and transmit a request signal for controlling the external object to the identified external electronic device based on identifying that the electronic device is approaching the external object.

9. The electronic device of claim 8, wherein the external object includes a blocking device for restricting access to a designated geographic area, wherein the request signal includes a request for controlling the blocking device, and wherein the request signal for controlling the blocking device includes authentication information of the electronic device registered in the identified external electronic device.

10. The electronic device of claim 1, further comprising:

a plurality of antennas including a first antenna and a second antenna, wherein the first antenna and the second antenna are configured as an omnidirectional antenna.

11. The electronic device of claim 10, wherein the instructions, when executed by the at least one processor individually or collectively, cause the electronic device to:

transmit the second UWB signal to the identified external electronic device, using the first antenna, and receive the reflection of the second UWB signal within the identified time interval, using the second antenna.

12. The electronic device of claim 10, where-in the plurality of antennas includes at least one antenna configured as a directional antenna, and wherein the instructions, when executed by the at least one processor individually or collectively, cause the electronic device to identify the distance information between the at least one external electronic device and the electronic device, using the first antenna and the at least one antenna.

13. The electronic device of claim 12, wherein the instructions, when executed by the at least one processor individually or collectively, cause the electronic device to:

identify that a UWB signal corresponding to the first UWB signal, which is transmitted to a first external electronic device among the at least one external electronic device in a time section allocated for the first external electronic device, has a collision with an external signal, based on identifying that the UWB signal has the collision with the external signal, allocate another time section for the first external electronic device in the reference period, and transmit another UWB signal corresponding to the first UWB signal to the first external electronic device in the another time section for the first external electronic device in the reference period.

14. The electronic device of claim 1, wherein the response signal includes information on a delay for transmitting the response signal, wherein the instructions, when executed by the at least one processor individually or collectively, cause the electronic device to:

identify a timing at which the first UWB signal is transmitted, and identify information on a location for the at least one external electronic device, based on information on the timing at which the first UWB signal is transmitted, a timing at which the response signal is received, and the delay for transmitting the response signal.

15. The electronic device of claim 1, wherein the instructions, when executed by the at least one processor individually or collectively, cause the electronic device to obtain the information on the external object, based on another time interval from a timing at which the second UWB signal is transmitted, to a timing at which the reflection of the second UWB signal is received.

16. The electronic device of claim 1, wherein the instructions, when executed by the at least one processor individually or collectively, cause the electronic device to:

receive the reflection of the second UWB signal reflected by at least one surface of the external object, based on the reflected signal, identify information on the at least one surface of the external object, and based on the information on the at least one surface of the external object, obtain information on a shape of the external object.

17. The electronic device of claim 1, wherein the identified external electronic device is closest to the electronic device in the at least one external electronic device.

18. The electronic device of claim 1, wherein the distance information includes the distance between the electronic device and the identified external electronic device; and wherein the information on the external electronic device includes another distance between the electronic device and the external object.

19. A method performed by an electronic device comprising:

identifying that, via communication circuitry for radio access technology (RAT) distinct from ultra wide band (UWB) included in the electronic device, a strength of a signal transmitted from one of at least one external electronic device is greater than a reference strength;

based on identifying that the strength of a signal transmitted from one of the at least one external electronic device is greater than the reference strength, allocating, for each of the at least one external electronic device, at least one time section periodically allocated in a reference period, wherein a time section is allocated for a corresponding one of the at least one external electronic device;

transmitting a first UWB signal to the at least one external electronic device, wherein the first UWB signal is transmitted in the at least one time section;

based on transmitting the first UWB signal, receiving a response signal, via the UWB circuitry, from the at least one external electronic device;

based on the response signal received from each of the at least one external electronic device, identifying distance information between the at least one external electronic device and the electronic device;

based on the distance information between the at least one external electronic device and the electronic device, identifying, among the at least one external electronic device, an external electronic device in an external object located within a reference distance from the electronic device;

transmitting a second UWB signal via the UWB circuitry, toward the identified external electronic device;

receiving a reflection of the second UWB signal, wherein the reflection of the second UWB signal is a radio signal that echoes from the external object within a time interval identified based on a distance between the electronic device and the identified external electronic device, based on the reflection, obtaining information on the external object and transmitting a request signal to the external object for controlling a function of the external object based on the information on the external object.

20. A non-transitory computer readable storage medium storing one or more programs, the one or more programs including instructions, which, when being executed by at least one processor of an electronic device with ultra wide band (UWB) circuitry and communication circuitry for radio access technology (RAT) distinct from UWB, cause the electronic device to:

identify that, via the communication circuitry, a strength of a signal transmitted from one of at least one external electronic device is greater than a reference strength, based on identifying that the strength of a signal transmitted from one of the at least one external electronic device is greater than the reference strength, allocate, for each of the at least one external electronic device, at least one time section periodically allocated in a reference period, wherein a time section is allocated for a corresponding one of the at least one external electronic device, transmit a first UWB signal to the at least one external electronic device, wherein the first UWB signal is transmitted in the at least one time section, based on transmitting the first UWB signal, receive a response signal, via the UWB circuitry, from the at least one external electronic device, based on the response signal received from each of the at least one external electronic device, identify distance information between the at least one external electronic device and the electronic device, based on the distance information between the at least one external electronic device and the electronic device, identify, among the at least one external electronic device, an external electronic device in an external object located within a reference distance from the electronic device, transmit a second UWB signal via the UWB circuitry, toward the identified external electronic device, receive a reflection of the second UWB signal, wherein the reflection of the second UWB signal is a radio signal that echoes from the external object within a time interval identified based on a distance between the electronic device and the identified external electronic device, based on the reflection, obtain information on the external object and transmitting a request signal to the external object for controlling a function of the external object based on the information on the external object.

* * * * *